(12) United States Patent
Nakayama et al.

(10) Patent No.: US 11,721,011 B2
(45) Date of Patent: Aug. 8, 2023

(54) INFORMATION PROCESSING APPARATUS, FILM FORMING APPARATUS, METHOD OF MANUFACTURING ARTICLE, AND NON-TRANSITORY COMPUTER-READABLE STORAGE MEDIUM

(71) Applicant: CANON KABUSHIKI KAISHA, Tokyo (JP)

(72) Inventors: Takahiro Nakayama, Tochigi (JP); Yuichiro Oguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 37 days.

(21) Appl. No.: 17/380,087

(22) Filed: Jul. 20, 2021

(65) Prior Publication Data
US 2022/0036540 A1 Feb. 3, 2022

(30) Foreign Application Priority Data
Jul. 28, 2020 (JP) .................................. 2020-127639

(51) Int. Cl.
*G06T 7/00* (2017.01)
*G06F 3/14* (2006.01)
*H04N 7/18* (2006.01)
*G06V 40/20* (2022.01)

(52) U.S. Cl.
CPC .............. *G06T 7/0004* (2013.01); *G06F 3/14* (2013.01); *G06V 40/20* (2022.01); *H04N 7/18* (2013.01); *G06T 2207/20076* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 5,841,520 A | * | 11/1998 | Taniguchi | G03F 7/70725 250/559.3 |
| 7,849,423 B1 | * | 12/2010 | Yenikaya | G03F 1/36 716/55 |
| 9,201,990 B2 | | 12/2015 | Wakamatsu | |
| 2007/0064224 A1 | * | 3/2007 | Kreh | G01N 21/9501 356/237.2 |
| 2008/0301621 A1 | * | 12/2008 | Fukuhara | G03F 1/36 716/51 |
| 2011/0188734 A1 | * | 8/2011 | Tsuchiya | G06T 7/001 382/149 |

(Continued)

FOREIGN PATENT DOCUMENTS

JP 5599356 B2 10/2014

*Primary Examiner* — Stefan Gadomski
(74) *Attorney, Agent, or Firm* — Rossi, Kimms & McDowell LLP

(57) ABSTRACT

The present invention provides an information processing apparatus comprising: an obtainer configured to, in a process of supplying a curable composition onto a substrate or a mold and forming a film of the curable composition in a space between the substrate and the mold, obtain the captured image of the curable composition; a generator configured to generate a predicted image representing a prediction result of a behavior of the curable composition on the substrate in the process; and a display controller configured to display, on a display unit, the captured image and the predicted image to be comparable to each other.

22 Claims, 13 Drawing Sheets

(56) References Cited

U.S. PATENT DOCUMENTS

| | | | | |
|---|---|---|---|---|
| 2013/0028503 | A1* | 1/2013 | Wakui | H01B 13/003 |
| | | | | 382/141 |
| 2015/0049315 | A1* | 2/2015 | Hoshino | G03F 7/70308 |
| | | | | 355/52 |
| 2018/0045506 | A1* | 2/2018 | Kitagawa | G01B 11/06 |
| 2020/0041915 | A1* | 2/2020 | Yu | G03F 7/2022 |
| 2020/0265576 | A1* | 8/2020 | Sasaki | G06T 7/0008 |
| 2020/0388025 | A1* | 12/2020 | Tsuruda | H01L 21/00 |
| 2022/0237770 | A1* | 7/2022 | Iwanaga | G03F 7/20 |
| 2022/0252507 | A1* | 8/2022 | Noda | H04N 5/232 |
| 2022/0252992 | A1* | 8/2022 | Tadokoro | G03F 7/42 |
| 2022/0253508 | A1* | 8/2022 | Tagawa | G06T 11/003 |

\* cited by examiner

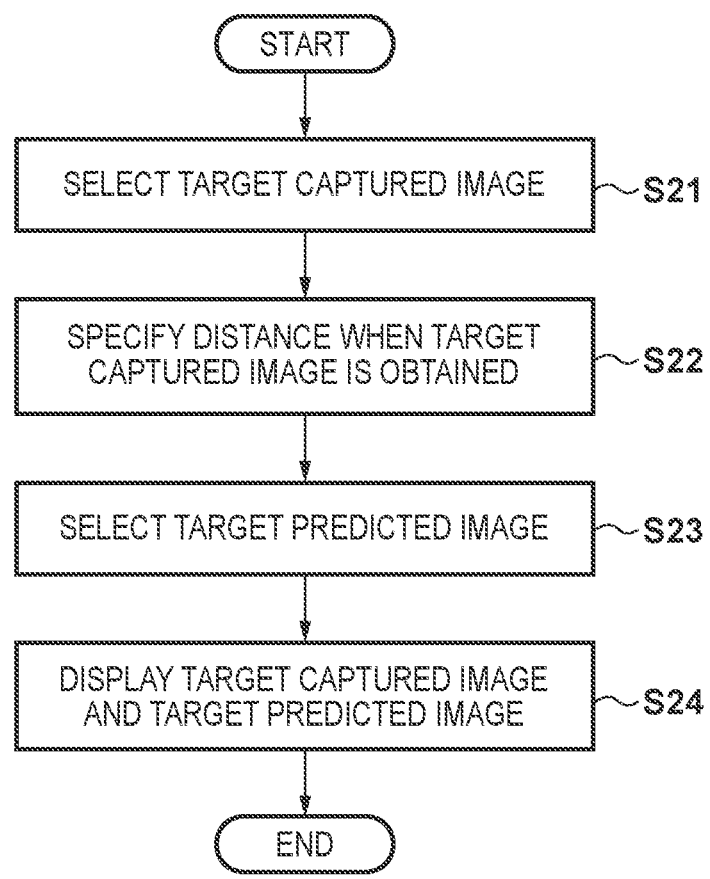

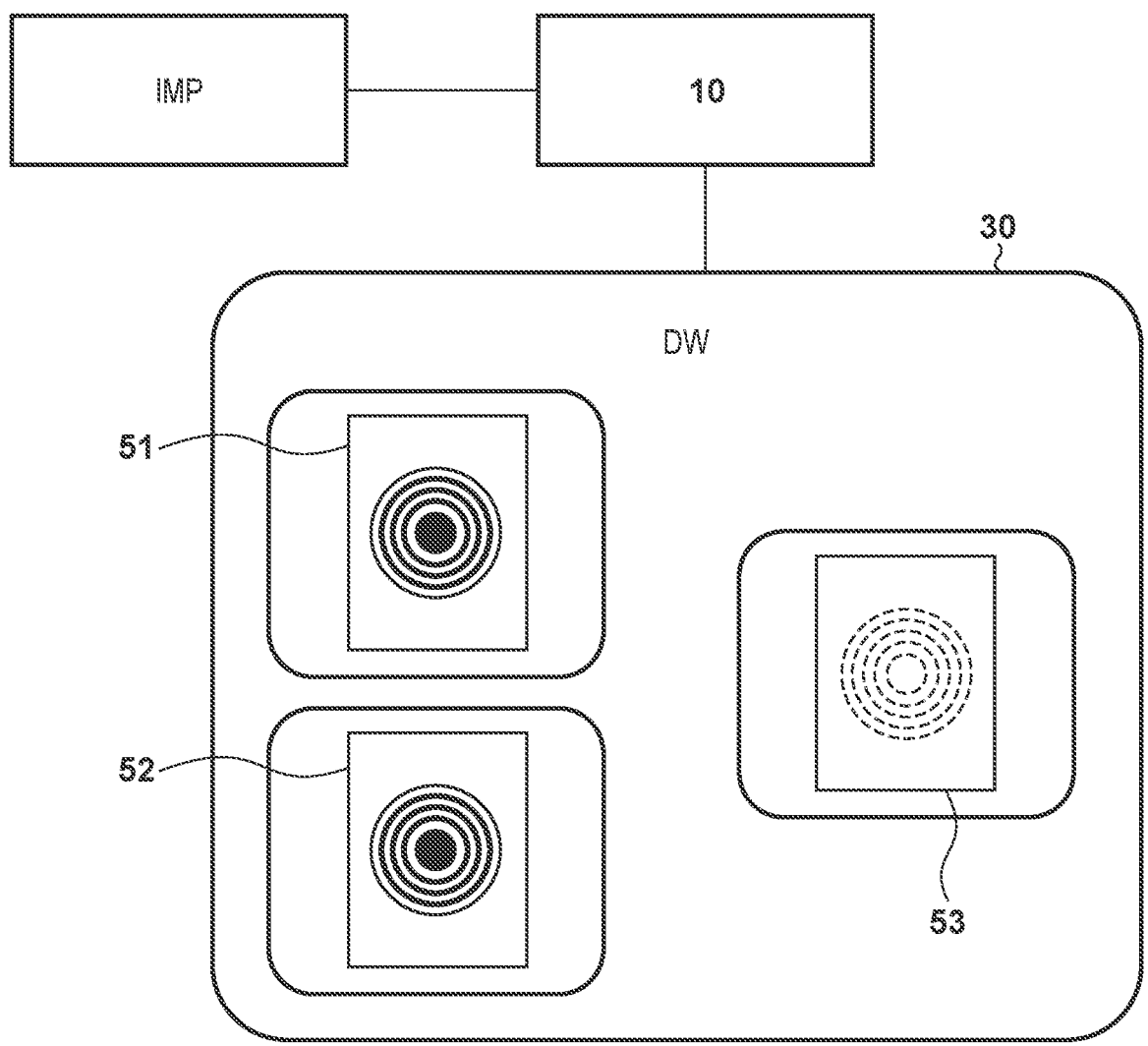

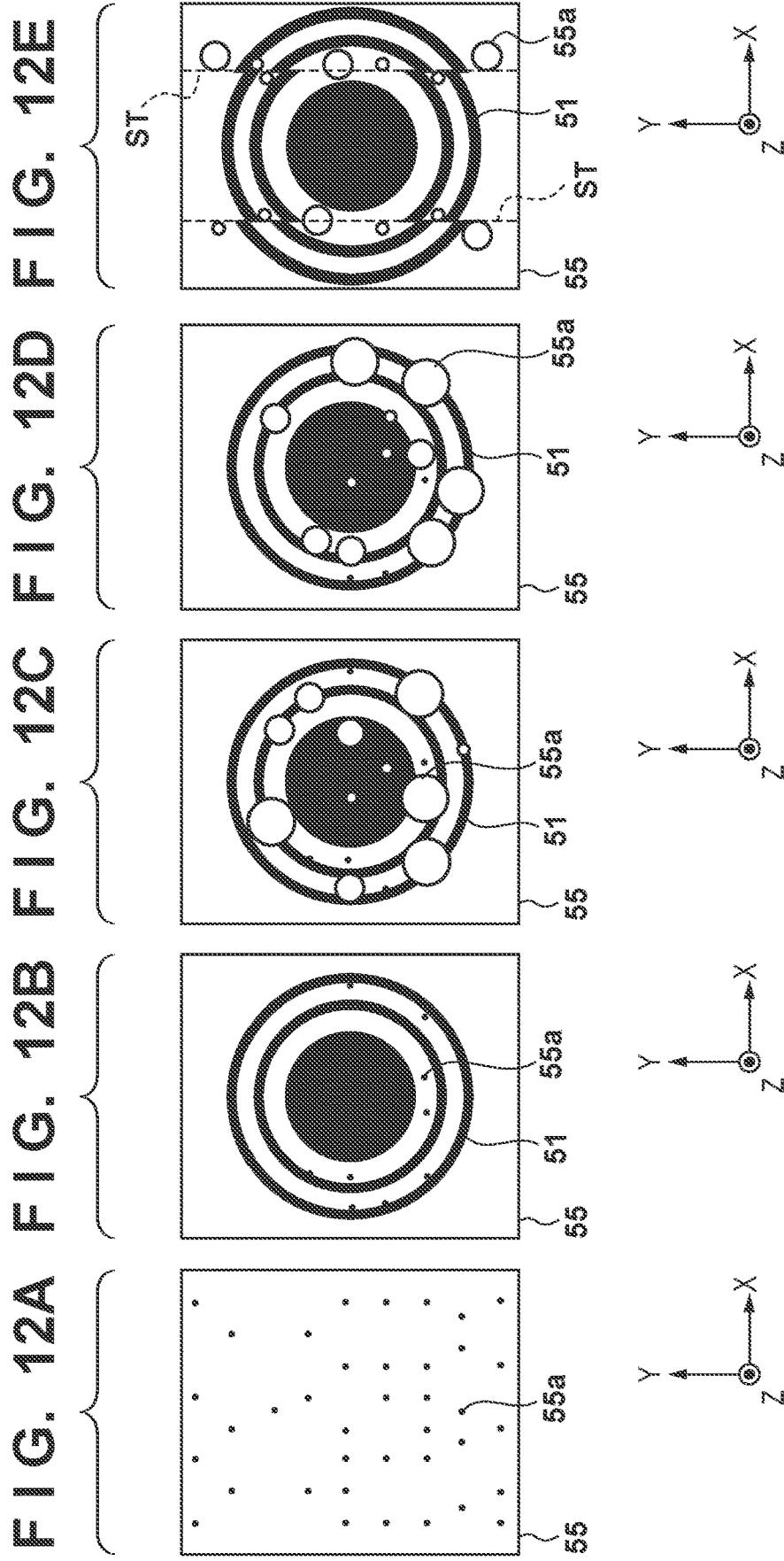

FIG. 13A
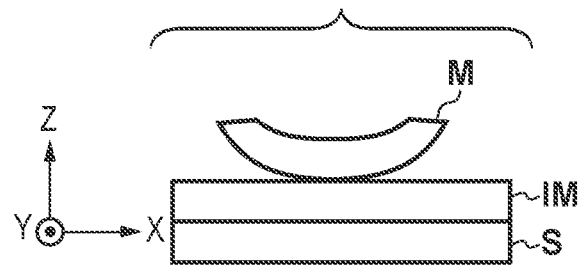
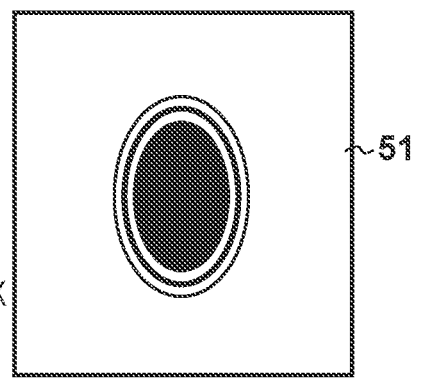
FIG. 13B
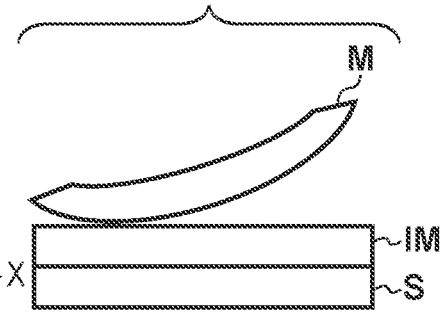
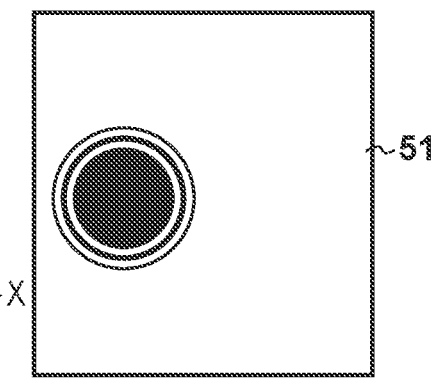
FIG. 13C
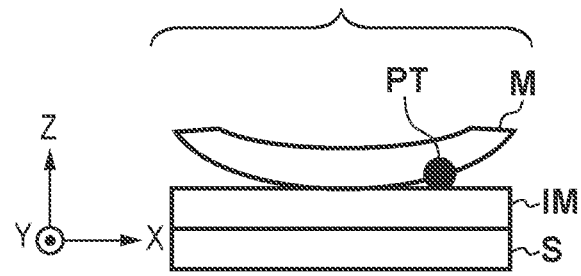
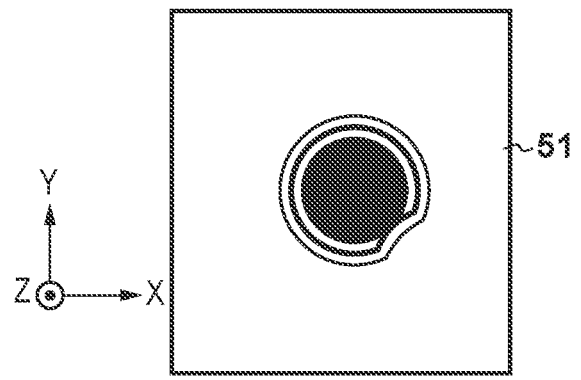

INFORMATION PROCESSING APPARATUS, FILM FORMING APPARATUS, METHOD OF MANUFACTURING ARTICLE, AND NON-TRANSITORY COMPUTER-READABLE STORAGE MEDIUM

BACKGROUND OF THE INVENTION

Field of the Invention

The present invention relates to an information processing apparatus, a film forming apparatus, a method of manufacturing an article, and a non-transitory computer-readable storage medium.

Description of the Related Art

There is known a film forming apparatus that supplies a curable composition onto a substrate or a mold and forms a film of the curable composition in a space between the substrate and the mold. Examples of such film forming apparatus are an imprint apparatus and a planarization apparatus. The imprint apparatus can use a mold having a pattern to transfer the pattern to the curable composition on the substrate. The planarization apparatus can use a mold having a flat surface to planarize the curable composition on the substrate.

The film forming apparatus needs to optimize various parameters (conditions) in a process of supplying the curable composition onto the substrate or the mold and forming a film of the curable composition in the space between the substrate and the mold, and a simulation technique can be used in the optimization operation. Japanese Patent No. 5599356 discloses a simulation method for predicting wet-spreading and coalescence of a plurality of droplets on a pattern forming surface defined by a concave-convex pattern.

In an actual process of forming a film of the curable composition by the film forming apparatus, an event that could not be considered in a simulation may occur and it is desired to quickly grasp and cope with the event. If the event is not a problem in forming a film of the curable composition, it is desired to modify (update) the set condition of the simulation.

SUMMARY OF THE INVENTION

The present invention provides, for example, a technique advantageous in making it easy to grasp an event that could not be considered in a simulation in a process of forming a film of a curable composition between a substrate and a mold.

According to one aspect of the present invention, there is provided an information processing apparatus comprising: an obtainer configured to, in a process of supplying a curable composition onto a substrate or a mold and forming a film of the curable composition in a space between the substrate and the mold, obtain the captured image of the curable composition; a generator configured to generate a predicted image representing a prediction result of a behavior of the curable composition on the substrate in the process; and a display controller configured to display, on a display unit, the captured image and the predicted image to be comparable to each other.

Further features of the present invention will become apparent from the following description of exemplary embodiments with reference to the attached drawings.

BRIEF DESCRIPTION OF THE DRAWINGS

FIG. 9 is a flowchart illustrating a display control method of the captured image and the predicted image;

FIG. 10 is a view showing an example of display of the captured image and the predicted image;

FIGS. 12A to 12E are views each showing an example of display of the captured image and the predicted image;

FIGS. 13A to 13C are views for explaining the captured image when an abnormality occurs in the film forming process.

DESCRIPTION OF THE EMBODIMENTS

Figure 1:
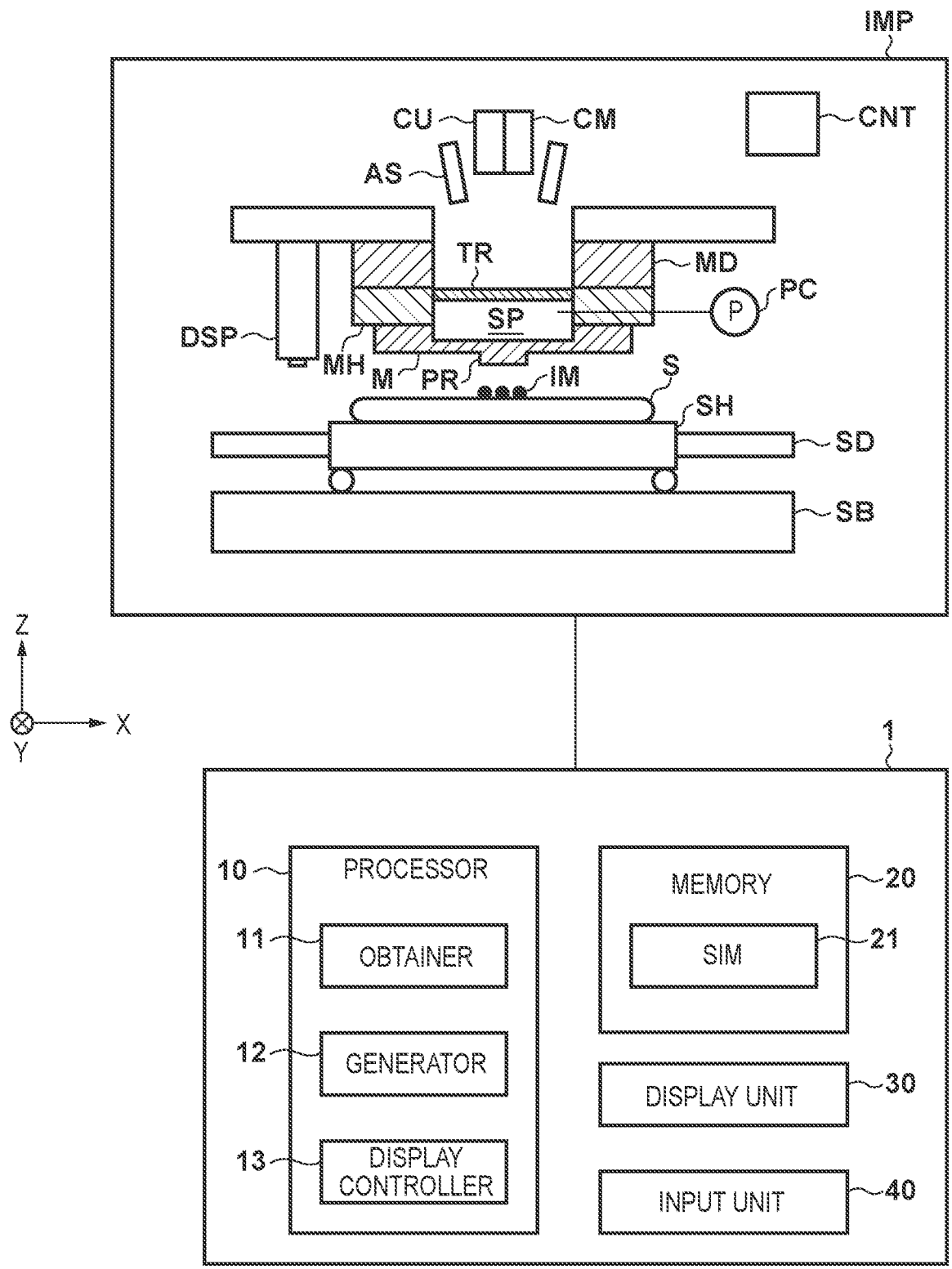
FIG. 1 is a view showing an example of the configuration of a system including a film forming apparatus and an information processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The first embodiment according to the present invention will be described. FIG. 1 is a view showing an example of the configuration of a system including a film forming apparatus IMP and an information processing apparatus 1. The film forming apparatus IMP executes a process (to sometimes be referred to as a film forming process hereinafter) of bringing a plurality of droplets of a curable composition IM arranged on a substrate S and a mold M into contact with each other and forming a film of the curable composition IM in a space between the substrate S and the mold M. The film forming apparatus IMP may be formed as, for example, an imprint apparatus or a planarization apparatus. The substrate S and the mold M are interchangeable, and a film of the curable composition IM may be formed in the space between the mold M and the substrate S by bringing a plurality of droplets of the curable composition IM arranged on the mold M and the substrate S into contact with each other. Therefore, the film forming apparatus IMP is comprehensively an apparatus that executes a process of bringing a plurality of droplets of the curable composition IM arranged on the first member and the second member into contact with each other and forming a film of the curable composition IM in a space between the first member and the second member. In this case, the first member may serve as the substrate S and the second member may serve as the mold M or the first member may serve as the mold M and the second member may serve as the substrate S.

The imprint apparatus is an apparatus that uses the mold M having a pattern to transfer the pattern of the mold M to the curable composition IM on the substrate S. The imprint apparatus can use the mold M having a pattern region PR provided with a concave-convex pattern. The imprint apparatus can bring the curable composition IM on the substrate S and the pattern region PR of the mold M into contact with each other, fill, with the curable composition IM, a space between the mold M and a region where the pattern of the substrate S is to be formed, and then cure the curable composition IM. This transfers the pattern of the pattern region PR of the mold M to the curable composition IM on the substrate S. For example, the imprint apparatus can form a pattern made of a cured product of the curable composition IM on each of a plurality of shot regions on the substrate S.

The planarization apparatus is an apparatus that forms a film having a flat upper surface on the substrate using the mold M having a flat surface by bringing the curable composition IM on the substrate S and the flat surface into contact with each other and curing the curable composition IM. The planarization apparatus can form a film made of a cured product of the curable composition IM on the entire region of the substrate S by normally using the mold M having a size that can cover the entire region of the substrate S.

As the curable composition IM, a material to be cured by receiving curing energy can be used. As the curing energy, an electromagnetic wave, heat, or the like can be used. The electromagnetic wave can include, for example, light selected from the wavelength range of 10 nm (inclusive) to 1 mm (inclusive) and, more specifically, infrared light, a visible light beam, or ultraviolet light. The curable composition IM can be a composition cured by light irradiation or heating. A photo-curable composition IM cured by light irradiation contains at least a polymerizable compound and a photopolymerization initiator, and may further contain a nonpolymerizable compound or a solvent, as needed. The nonpolymerizable compound is at least one material selected from the group consisting of a sensitizer, a hydrogen donor, an internal mold release agent, a surfactant, an antioxidant, and a polymer component. The viscosity (the viscosity at 25° C.) of the curable composition IM can be, for example, 1 mPa·s (inclusive) to 100 mPa·s (inclusive). As the material of the substrate S, for example, glass, a ceramic, a metal, a semiconductor, a resin, or the like can be used. A member made of a material different from the substrate S may be provided on the surface of the substrate S, as needed. The substrate S includes, for example, a silicon wafer, a compound semiconductor wafer, or silica glass.

In the specification and the accompanying drawings, directions will be indicated on an XYZ coordinate system in which directions parallel to the surface of the substrate S are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are $\theta X$, $\theta Y$, and $\theta Z$, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the $\theta X$-axis, the $\theta Y$-axis, and the $\theta Z$-axis means control or driving concerning a rotation about an axis parallel to the X-axis, a rotation about an axis parallel to the Y-axis, and a rotation about an axis parallel to the Z-axis, respectively. In addition, a position is information that can be specified based on coordinates on the X-, Y-, and Z-axes, and an orientation is information that can be specified by values on the $\theta X$-, $\theta Y$-, and $\theta Z$-axes. Positioning means controlling the position and/or orientation.

The film forming apparatus IMP can include a substrate holder SH that holds the substrate S, a substrate driving mechanism SD that drives the substrate S by driving the substrate holder SH, and a support base SB that supports the substrate driving mechanism SD. In addition, the film forming apparatus IMP can include a mold holder MH that holds the mold M and a mold driving mechanism MD that drives the mold M by driving the mold holder MH. The substrate driving mechanism SD and the mold driving mechanism MD can form a relative driving mechanism (driver) that relatively drives the substrate S and the mold M so as to adjust the relative position between the substrate S and the mold M. Adjustment of the relative position by the relative driving mechanism can include driving to bring the curable composition IM on the substrate S and the mold M into contact with each other and driving to separate the mold M from the cured curable composition IM. In addition, adjustment of the relative position by the relative driving mechanism can include positioning between the substrate S and the mold M. The substrate driving mechanism SD can be configured to drive the substrate S with respect to a plurality of axes (for example, three axes including the X-axis, Y-axis, and $\theta Z$-axis, and preferably six axes including the X-axis, Y-axis, Z-axis, $\theta X$-axis, $\theta Y$-axis, and $\theta Z$-axis). The mold driving mechanism MD can be configured to drive the mold M with respect to a plurality of axes (for example, three axes including the Z-axis, $\theta X$-axis, and $\theta Y$-axis, and preferably six axes including the X-axis, Y-axis, Z-axis, $\theta X$-axis, $\theta Y$-axis, and $\theta Z$-axis).

The film forming apparatus IMP can include a curing device CU for curing the curable composition IM with which the space between the substrate S and the mold M is filled. For example, the curing device CU can irradiate the curable composition IM with the curing energy (for example, ultraviolet light) via the mold M, thereby curing the curable composition IM. The film forming apparatus IMP can include a transmissive member TR for forming a space SP on the back surface side (the opposite side of a surface opposing the substrate S) of the mold M. The transmissive member TR is made of a material that transmits the curing energy from the curing device CU, thereby making it possible to irradiate the curable composition IM with the curing energy. The film forming apparatus IMP can include a pressure controller PC that controls deformation of the mold M in the Z-axis direction by controlling the pressure of the space SP. For example, when the pressure controller PC makes the pressure of the space SP higher than the atmospheric pressure, the mold M can be deformed in a convex shape toward the substrate S. It is possible to reduce bubbles remaining in the curable composition IM between the mold M and the substrate S by bringing the mold M and the curable composition IM on the substrate into contact with each other while controlling the deformation of the mold M by the pressure controller PC so as to gradually increase the contact area between the mold M and the curable composition IM on the substrate.

The film forming apparatus IMP can include an image capturing device CM (observation device) that obtains a captured image by capturing an image of at least one of the mold M and the substrate S in the film forming process. In this embodiment, the image capturing device CM includes, for example, a light source and an image sensor, and temporally captures the curable composition IM on the substrate via the mold M in the film forming process to obtain a plurality of captured images representing the status of the film forming process. The plurality of captured images obtained by the image capturing device CM are stored as still images or moving images in the memory of a controller CNT and/or a memory 20 of the information processing apparatus 1.

Figure 2A:
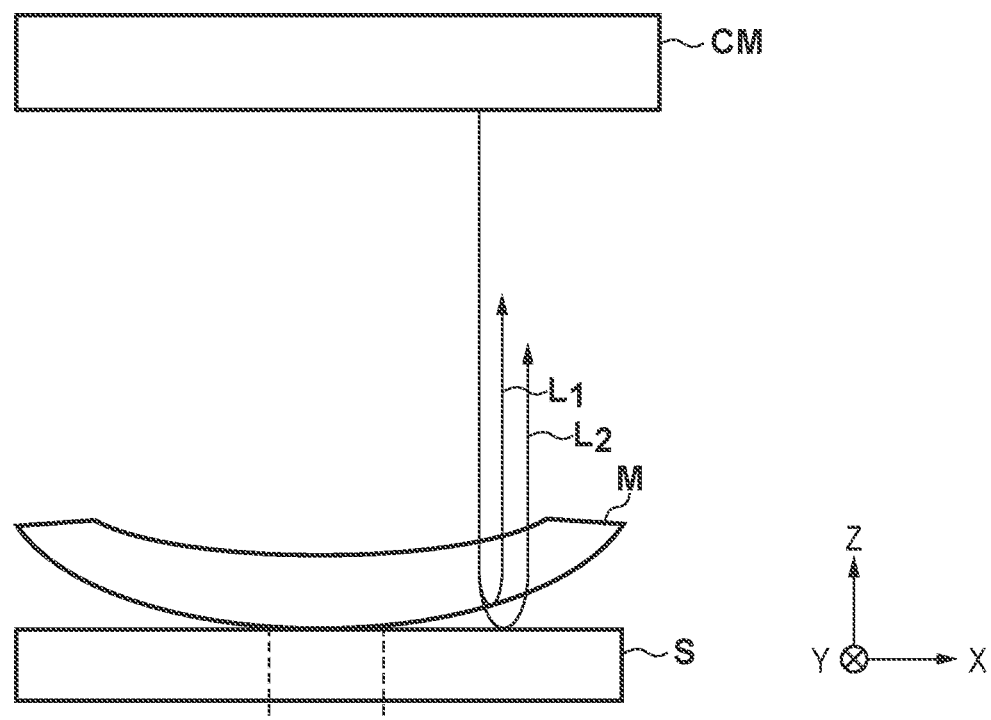
FIGS. 2A and 2B are views for explaining the principle of occurrence of interference fringes.
Figure 2B:
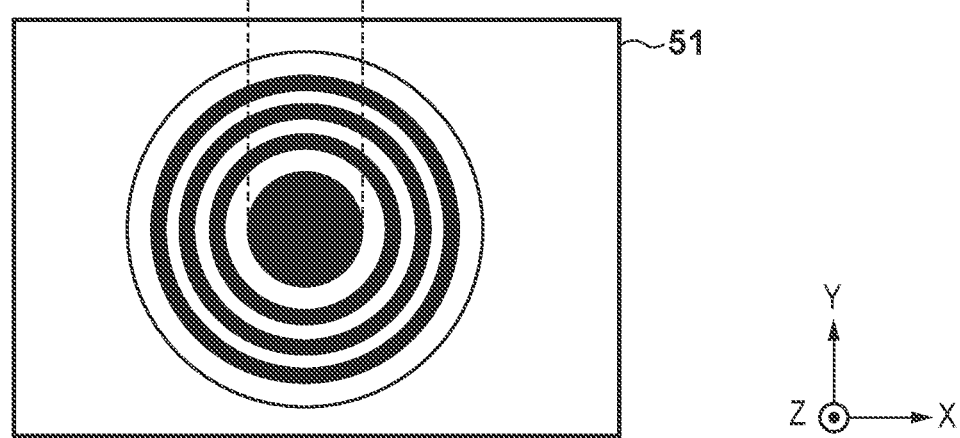

The image capturing device CM irradiates, via the mold M, the substrate S (shot region) with light (image capturing light) emitted from the light source, and causes the image sensor to detect light L1 reflected by the pattern region PR of the mold M and light L2 reflected by the surface of the substrate S. If, as shown in FIG. 2A, the pattern region PR of the mold M deformed in the convex shape by the pressure controller PC is brought into contact with the curable composition IM on the substrate, an interval (gap) between the mold M and the substrate S changes in accordance with the position in the X and Y directions. In this case, since the optical path length difference between the light L1 reflected by the pattern region PR and the light L2 reflected by the substrate S changes in accordance with the position in the X and Y directions, interference fringes (so-called Newton rings) can be formed in a captured image 51 obtained by the image capturing device CM, as shown in FIG. 2B. That is, the image capturing device CM can obtain, as a captured image, an image of interference fringes generated in accordance with the distance between the mold M and the substrate S in a process of bringing the mold M and the curable composition IM on the substrate into contact with each other. Note that light (image capturing light) used by the image capturing device CM preferably has a wavelength that does not cure the curable composition IM.

The film forming apparatus IMP can include a dispenser DSP (supplier) for arranging, supplying, or dispensing the curable composition IM on the substrate S. The substrate S on which the curable composition IM is arranged may be supplied to the film forming apparatus IMP by another apparatus. In this case, the film forming apparatus IMP need not include the dispenser DSP. The film forming apparatus IMP may include an alignment scope AS for measuring an alignment error between the substrate S (or the shot region of the substrate S) and the mold M. Furthermore, the film forming apparatus IMP can include the controller CNT that controls each unit of the film forming apparatus IMP. The controller CNT can be formed by, for example, a computer including a CPU and a memory. The controller CNT may be configured to include the information processing apparatus 1 (or its function) (to be described later).

The information processing apparatus 1 can be formed by, for example, incorporating a simulation program 21 in a general-purpose or dedicated computer. Alternatively, the information processing apparatus 1 can be formed by a PLD (the abbreviation of a Programmable Logic Device) such as an FPGA (the abbreviation of a Field Programmable Gate Array) or an ASIC (the abbreviation of an Application Specific Integrated Circuit). In one example, the information processing apparatus 1 is formed by a computer including a processor 10, the memory 20, a display unit 30 (display), and an input unit 40 (input device), and stores the simulation program 21 in the memory 20. The memory 20 may be a semiconductor memory, a disk such as a hard disk, or a memory of another form. The simulation program 21 can be stored in a computer-readable memory medium or provided to the information processing apparatus 1 via a communication facility such as a telecommunication network.

The processor 10 according to this embodiment is formed by a CPU and the like, and can include an obtainer 11, a generator 12, and a display controller 13.

The obtainer 11 can obtain, from the film forming apparatus IMP, a plurality of captured images (still images or moving images) obtained by temporally capturing an image of the curable composition IM on the substrate by the image capturing device CM in the film forming process, and manage them. For example, the obtainer 11 may store each of the plurality of captured images obtained by the image capturing device CM in the memory 20 in association with the distance between the mold M and the substrate S. As the distance between the mold M and the substrate S, a measurement result of the relative position in the Z direction between the mold M (for example, a location other than the pattern region PR) and the substrate S or a measurement result of the relative position in the Z direction between the mold holder MH and the substrate holder SH may be used. Furthermore, the obtainer 11 may store the plurality of captured images obtained by the image capturing device CM in the memory 20 for each shot region of the substrate S (that is, in association with each shot region) and/or each substrate S (that is, in association with each substrate). In this example, the obtainer 11 may store the plurality of captured images obtained by the image capturing device CM in the memory of the controller CNT.

The generator 12 predicts (simulates) the behavior of the curable composition IM on the substrate in the film forming process in accordance with the simulation program 21, and generates a predicted image (calculated image) representing a prediction result. For example, the generator 12 can predict the behavior of the curable composition IM in the contact process of bringing the mold M and the curable composition IM on the substrate into contact with each other, thereby generating a predicted image representing a prediction result of interference fringes generated in accordance with the distance between the mold M and the substrate S during the film forming process (contact process). Furthermore, the generator 12 may generate a predicted image representing the distribution of bubbles remaining in the curable composition IM during the film forming process (contact process). The generator 12 may generate, as a predicted image representing the distribution of the bubbles, an image including at least one piece of information of the position, the pressure, the volume, and the number of gas molecules of each bubble on the substrate.

The display controller 13 controls display of the captured image obtained by the obtainer 11 and the predicted image generated by the generator 12 on the display unit 30. In this embodiment, the display controller 13 displays, on the display unit 30, the captured image and the predicted image to be comparable to each other. Note that this embodiment will describe an example of displaying, on one display (one screen, the same screen) of the display unit 30, the captured image and the predicted image to be comparable to each other. The present invention, however, is not limited to this. If, for example, the display unit 30 includes a plurality of displays (a plurality of screens), the display controller 13 may display, on different displays, the captured image and the predicted image to be comparable to each other. In this embodiment, the display unit 30 is a component of the information processing apparatus 1. The present invention, however, is not limited to this, and the display unit 30 may be configured as an external device of the information processing apparatus 1. In this case, the display controller 13 can output, to the display unit 30 as the external device, screen data for displaying the captured image and the predicted image to be comparable to each other.

[Film Forming Process]

Figure 3:
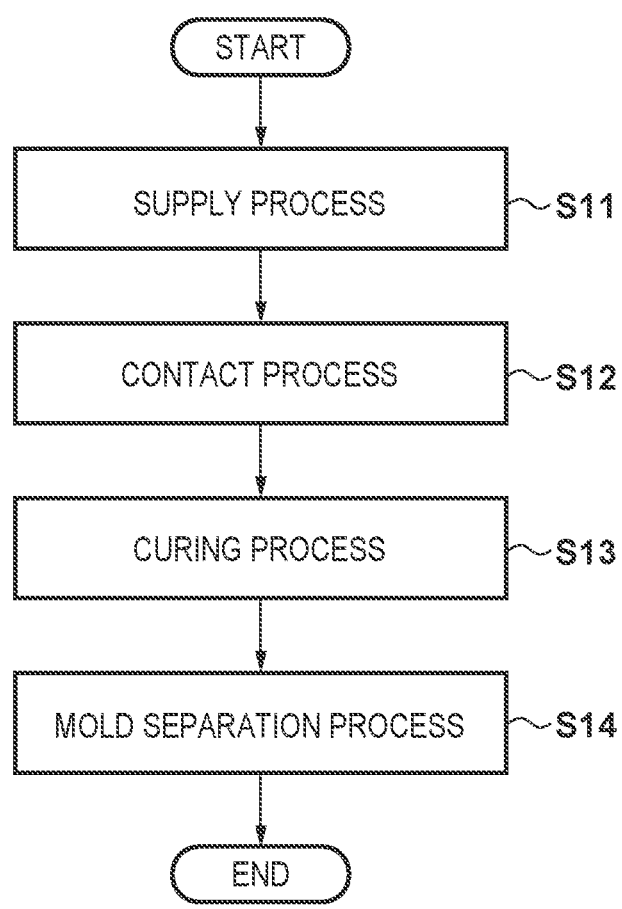
FIG. 3 is a flowchart illustrating a film forming process (imprint process)

The film forming process will be described next with reference to FIGS. 3 and 4A to 4F. As the film forming process, an imprint process of transferring the pattern of the mold M to the curable composition IM (imprint material) on the substrate by the imprint apparatus will be exemplified. FIG. 3 is a flowchart illustrating the imprint process and FIGS. 4A to 4F are views showing a change in state of the mold M, the substrate S, and the curable composition IM in the imprint process. As shown in FIG. 3, the imprint process can include a supply process (S11), a contact process (S12), a curing process (S13), and a mold separation process (S14).

Figure 4A:
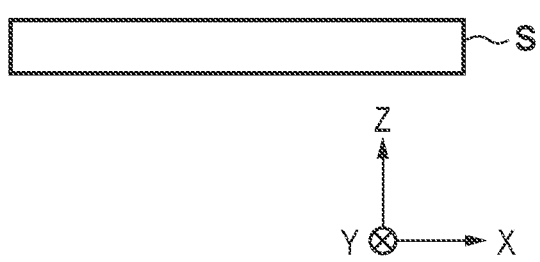
FIGS. 4A to 4F are views showing a change in state of a mold M, a substrate S, and a curable composition IM.
Figure 4B:
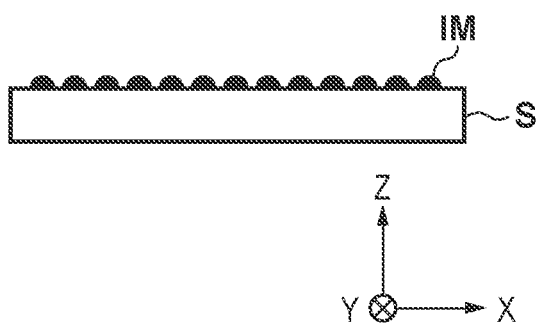

The supply process (S11) is a process of causing the dispenser DSP to discharge the curable composition IM as a plurality of droplets to supply the curable composition IM onto the substrate S. For example, FIG. 4A shows the substrate S before the imprint process starts. The substrate S is moved to a position below the dispenser DSP, and the dispenser DSP is caused to discharge the curable composition IM as a plurality of droplets while relatively moving the substrate S and the dispenser DSP so as to supply a droplet of the curable composition IM at a predetermined position on the substrate S. The substrate S and the dispenser DSP can relatively be moved by, for example, the substrate driving mechanism SD. This can form an array of droplets of the curable composition IM on the substrate S, as shown in FIG. 4B. Note that the curable composition IM may be supplied onto the mold M.

Figure 4C:
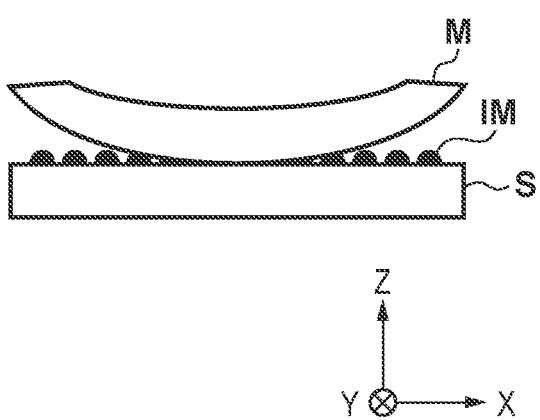

The contact process (S12) is a process of bringing the mold M and the curable composition IM on the substrate S into contact with each other by decreasing the distance in the Z direction between the mold M and the substrate S. The contact process (S12) can be said to be a process (pressing process) of pressing the mold M against the curable composition IM on the substrate S, and a force (pressing force) of pressing the mold M against the curable composition IM on the substrate S can change in the contact process. For example, if, as shown in FIG. 4C, the distance in the Z direction between the mold M and the substrate S is decreased in a state in which the mold M is deformed in the convex shape by the pressure controller PC, and the mold M and the curable composition IM on the substrate S start to contact each other, the deformation of the mold M by the pressure controller PC is gradually released. The operation of decreasing the distance in the Z direction between the mold M and the substrate S can be performed by the relative driving mechanism (mold driving mechanism MD and/or substrate driving mechanism SD). This can gradually increase the contact area between the mold M and the curable composition IM on the substrate S in the X and Y directions from the central portion to the peripheral portion, and bring the mold M and the curable composition IM on the substrate S into contact with each other so as to reduce the remaining bubbles in the curable composition IM.

The captured image obtained by the image capturing device CM in the contact process (S12) is an image including interference fringes, as described above. In this captured image, for example, the dimension, pitch, and interval of the interference fringes can temporally change in accordance with the distance in the Z direction between the mold M and the substrate S. In addition, since the wavelength of light (image capturing light) used by the image capturing device CM is already known, it is possible to estimate the surface shape (for example, the height distribution (Z-position distribution) of the pattern region PR) of the pattern region PR of the mold M using the wavelength based on the dimension, pitch, and interval of the interference fringes in the captured image. That is, it is possible to estimate the interval (for example, the distribution in the X and Y directions with respect to that interval) in the Z direction between the mold M and the substrate S based on the interference fringes of the captured image and the wavelength of the image capturing light. Note that at the initial stage of the contact process, the interval in the Z direction between the mold M and the substrate S is larger than the size (for example, 100 µm or less) of a droplet of the curable composition IM. In this case, the distance in the Z direction calculated based on the interference fringes of the captured image can be approximately regarded as the interval in the Z direction between the mold M and the substrate S. As the contact process progresses, the interval in the Z direction between the mold M and the substrate S becomes equal to or smaller than the size of the curable composition IM. In this case as well, since the curable composition IM is a material that transmits the image capturing light, the distance in the Z direction calculated from the interference fringes of the captured image can be approximately regarded as the interval in the Z direction between the mold M and the substrate S.

Figure 4D:
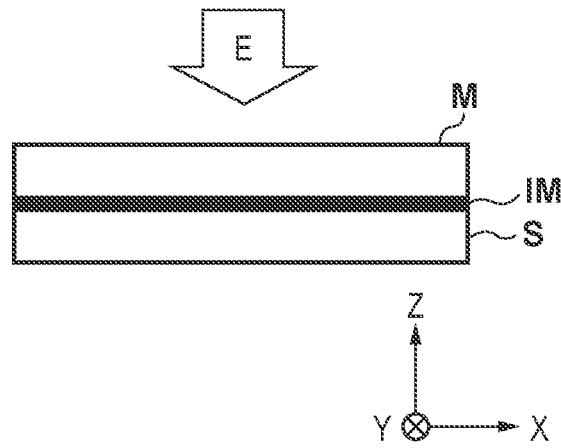

The curing process (S13) is a process of curing the curable composition IM in a state in which the mold M and the curable composition IM on the substrate S are in contact with each other. For example, the curable composition IM can be cured by irradiating the curable composition IM with energy E (for example, ultraviolet light) by the curing device CU in a state in which the entire pattern region PR of the mold M is in contact with the curable composition IM on the substrate S, as shown in FIG. 4D. The curing process can be executed after the entire pattern region PR of the mold M contacts the curable composition IM on the substrate S by the contact process and a predetermined time for filling the concave portions of the concave-convex pattern formed in the mold M with the curable composition IM elapses.

Figure 4E:
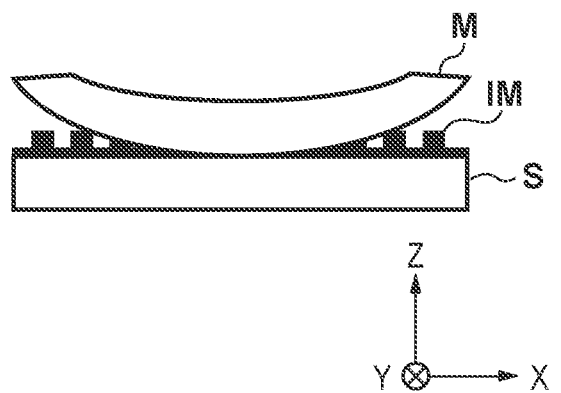
Figure 4F:
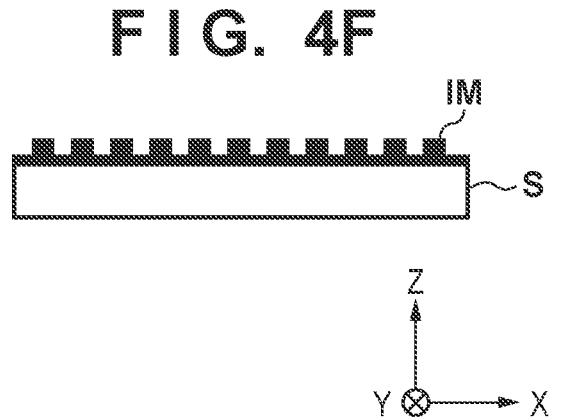

The mold separation process (S14) is a process of releasing (separating) the mold from the cured curable composition IM on the substrate S by increasing the distance in the Z direction between the mold M and the substrate S. For example, in the mold separation process, the mold M is released from the curable composition IM while deforming the mold M in the convex shape by the pressure controller PC, as shown in FIG. 4E. This can decrease the force (mold separation force) of separating the mold M from the cured curable composition IM on the substrate S, thereby avoiding damage to the pattern formed in the curable composition IM. Furthermore, when releasing the mold M from the curable composition IM while deforming the mold M in the convex shape in the mold separation process, interference fringes can be observed in the captured image obtained by the image capturing device CM, similar to the contact process. By performing the above-described processes (S11 to S14), a pattern corresponding to the pattern of the mold M can be formed in the curable composition IM on the substrate S, as shown in FIG. 4F.

[Example of Display of Images]

The film forming apparatus IMP has many apparatus-specific parameters (conditions) that should be considered in the film forming process (imprint process). Examples of the apparatus-specific parameters can be a force of holding the mold M, a relative tilt between the mold M and the substrate S, the shapes of the mold M and the substrate S, an amount of a droplet of the curable composition IM supplied onto the substrate S, the number of droplets, and the supply position of a droplet on the substrate S. Furthermore, examples of the apparatus-specific parameters can be a speed and force when bringing the mold M or the substrate S into contact with the curable composition IM, the peripheral atmosphere (the kind and pressure of a gas) of the curable composition IM, and a standby time for filling the pattern of the mold M with the curable composition IM. In addition, examples of the apparatus-specific parameters can be a light irradiation condition (illuminance and irradiation time) for curing the curable composition IM, and a speed and a force when releasing the mold M or the substrate S from the cured curable composition IM.

In optimizing the apparatus-specific parameters, actually performing the film forming process to repeat trial and error is complicated and takes a long time, and thus the simulation technique is preferably used. By using the simulation technique, the range of the parameters within which the film forming process is actually performed to repeat trial and error in order to optimize the parameters can be narrowed, thereby largely shortening the time taken to optimize the parameters.

In this embodiment, the simulation technique predicts the behavior of the curable composition IM on the substrate S in the film forming process, and can be executed by the generator 12 of the processor 10 in the information processing apparatus 1. An example of the simulation technique is a filling simulation for simulating (predicting) a process of filling the mold M with the curable composition IM. As the filling simulation, for example, a fluid dynamics simulation or a simulation method using an approximation method such as fluid lubrication approximation may be used. The present invention, however, is not limited to them, and any method that can calculate the flow of the curable composition IM may be used. By using the filling simulation, the generator 12 can calculate the distance in the Z direction between the mold M and the substrate S, and generate, based on the distance and the wavelength of the image capturing light, an image (predicted image) representing the prediction result of interference fringes generated in accordance with the distance. That is, the generator 12 can generate, as a predicted image, an image predicted to be obtained by the image capturing device CM in accordance with the distance in the Z direction between the mold M and the substrate S.

The simulation technique (filling simulation) outputs a prediction result in a state (preset precondition (set condition)) in which there is little external disturbance. Therefore, the result of the actual film forming process may be different from the prediction result obtained by the filling simulation. That is, in the actual film forming process, an event that could not be considered in the simulation may occur. In this case, it is desired to quickly grasp and cope with the event. Even if the event is not a problem in the film forming process, it is desired to modify (update) the set condition of the simulation.

To do this, in the information processing apparatus 1 according to this embodiment, the obtainer 11 obtains a captured image obtained by the image capturing device CM in the film forming process, and the generator 12 generates a predicted image representing the prediction result (simulation result) of the behavior of the curable composition IM on the substrate S in the film forming process. Then, the display controller 13 displays, on the display unit 30 (display), the captured image obtained by the obtainer 11 and the predicted image generated by the generator 12 to be comparable to each other. At this time, the display controller 13 displays the captured image and the predicted image on the display unit 30 by aligning (for example, matching) the images with each other with respect to at least one of the dimension and rotation. For example, the pattern region PR of the mold M is provided in a mesa structure, and the shape of the pattern region PR is readily recognized. Therefore, the display controller 13 processes the captured image and the predicted image so as to match each other with respect to at least one of the dimension and rotation of the pattern region PR, and displays them on the display unit 30. Furthermore, the display controller 13 displays the captured image and the predicted image on the display unit 30 so that a change in the captured image and that in the predicted image are synchronized with each other. By displaying, on the display unit 30, the captured image and the predicted image to be comparable to each other in this way, a user (operator) can readily grasp the event that could not be considered in the simulation in the film forming process.

Figure 5:
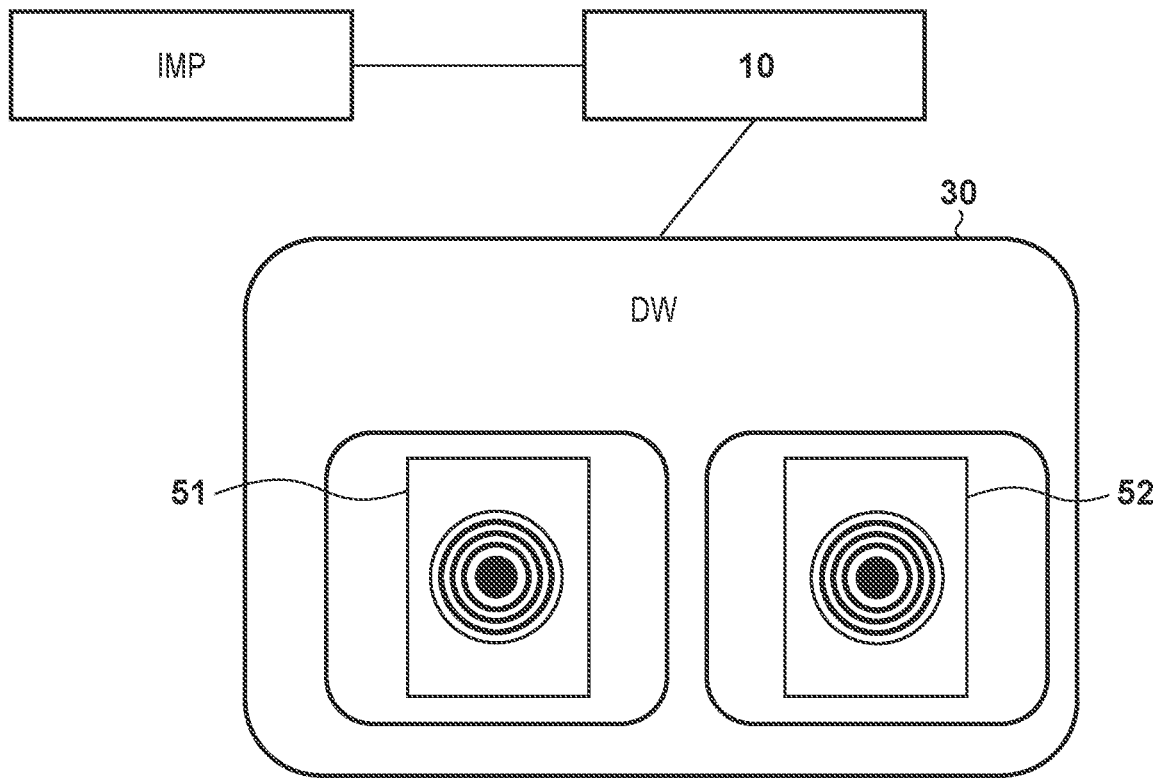
FIG. 5 is a view showing an example of display of a captured image and a predicted image.
Figure 6:
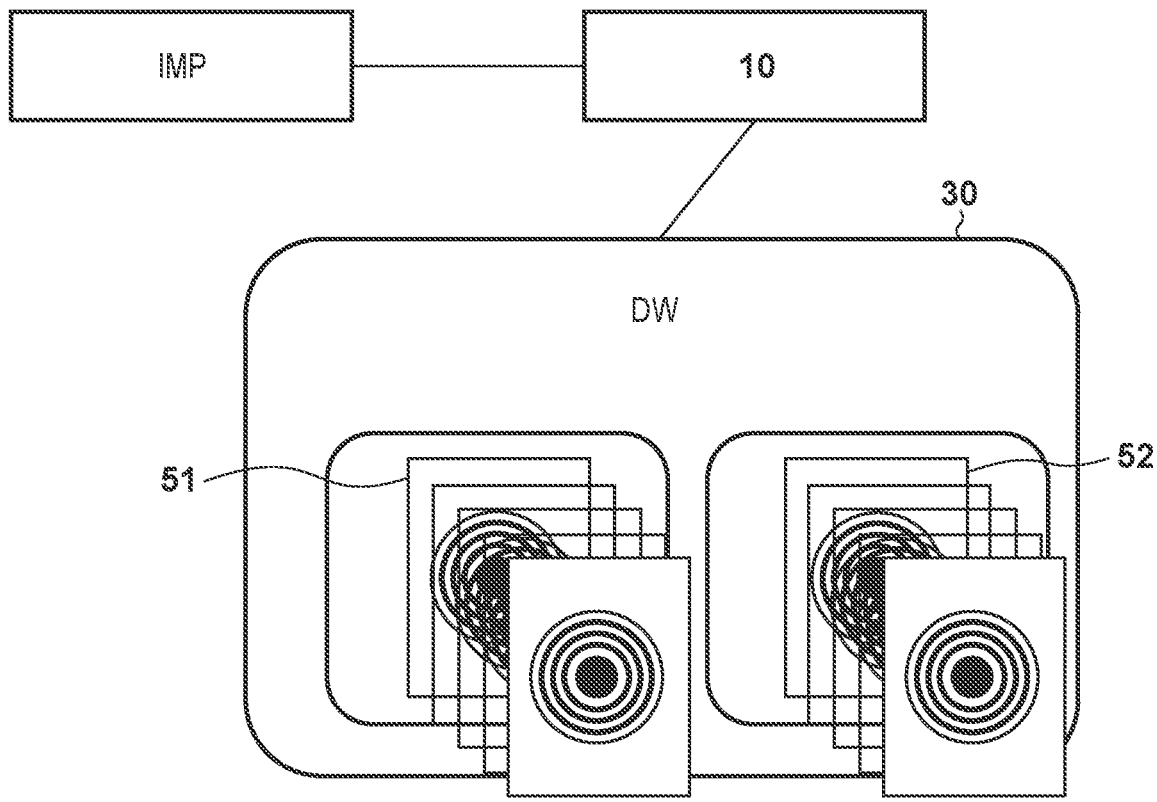
FIG. 6 is a view showing an example of display of the captured image and the predicted image.

FIGS. 5 and 6 each show an example of displaying, on a display screen DW (display region) of the display unit 30, the captured image 51 obtained by the obtainer 11 and a predicted image 52 generated by the generator 12 to be comparable to each other. FIG. 5 shows an example of simultaneously displaying, as still images, the captured image 51 and predicted image 52 each including interference fringes on the same display screen DW (same screen). FIG. 6 shows an example of simultaneously displaying, as moving images, the captured image 51 and predicted image 52 each including interference fringes on the same display screen DW. The captured image 51 and the predicted image 52 as moving images may be images obtained/generated during an arbitrary period in the film forming process but, as an example, can be images obtained/generated during a period from the end of the supply process to the end of the mold separation process. By displaying, on the display unit 30 (display screen DW), the captured image 51 and the predicted image 52 to be comparable to each other in this way, the user can be made to readily and quickly grasp the difference (the difference between the captured image 51 and the predicted image 52) from the simulation in the film forming process. As a result, the user can quickly grasp and cope with the event that could not be considered in the simulation.

Figure 7:
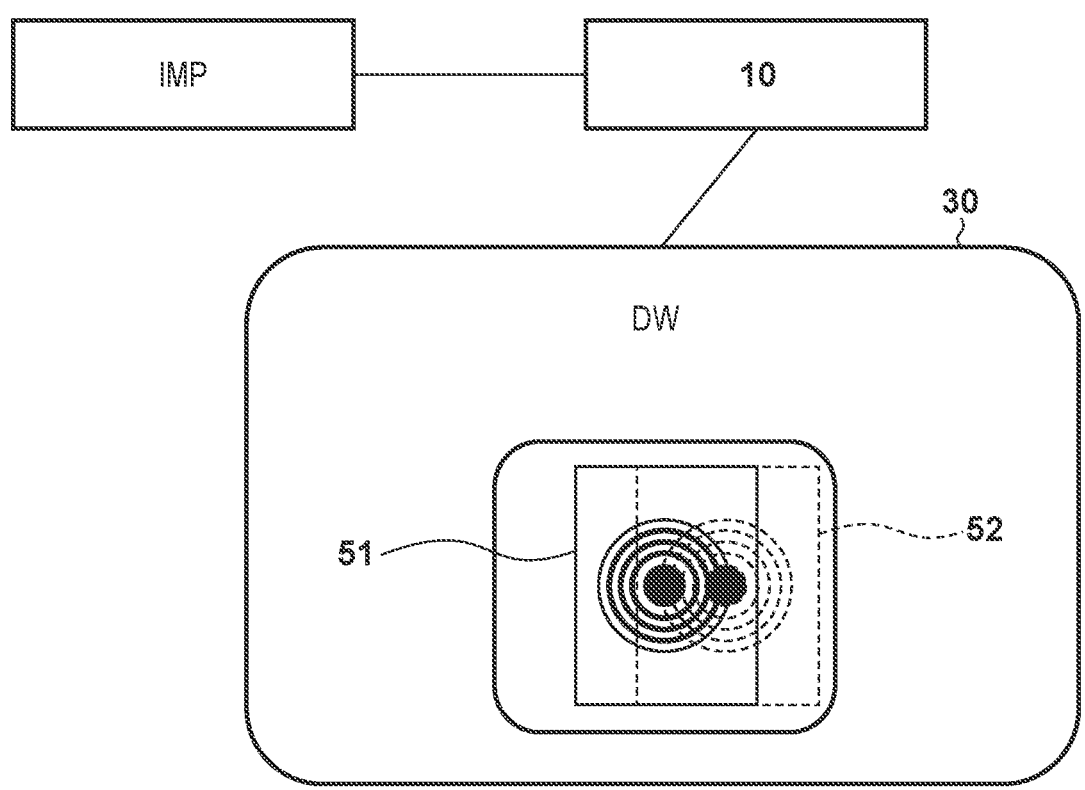
FIG. 7 is a view showing an example of display of the captured image and the predicted image.

FIG. 7 shows an example of superimposing the captured image 51 and the predicted image 52 each including interference fringes on each other and displaying them on the same display screen DW. Referring to FIG. 7, a solid line indicates the captured image 51 and a broken line indicates the predicted image 52. In the example shown in FIG. 7, for the sake of illustrative simplicity, the captured image 51 and the predicted image 52 are displayed on the display screen DW by shifting their positions from each other but may be displayed on the display screen DW by aligning their positions with each other. By displaying, on the display screen DW, the captured image 51 and the predicted image 52 superimposed on each other in this way, a different portion between the captured image 51 and the predicted image 52 can be readily, visually grasped.

On the display screen DW shown in FIGS. 5 to 7, only the captured image 51 and the predicted image 52 are displayed. However, information such as the operation panel of the film forming apparatus IMP and that of the information processing apparatus 1 may be displayed in addition to those images. The display screen DW on which the information is displayed may be displayed as a user interface on the display of the film forming apparatus IMP. Furthermore, the captured image 51 and the predicted image 52 may be displayed on an external display device (display unit). In this case, the display controller 13 can output, to the external display device, data for displaying the display screen DW shown in FIGS. 5 to 7.

Figure 8A:
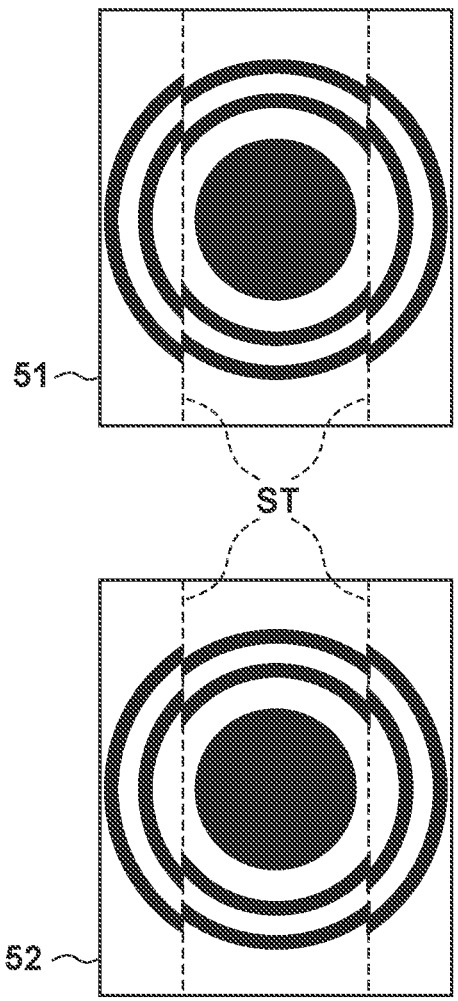
FIGS. 8A and 8B are views each showing the captured image and the predicted image when steps are generated in the substrate.
Figure 8B:
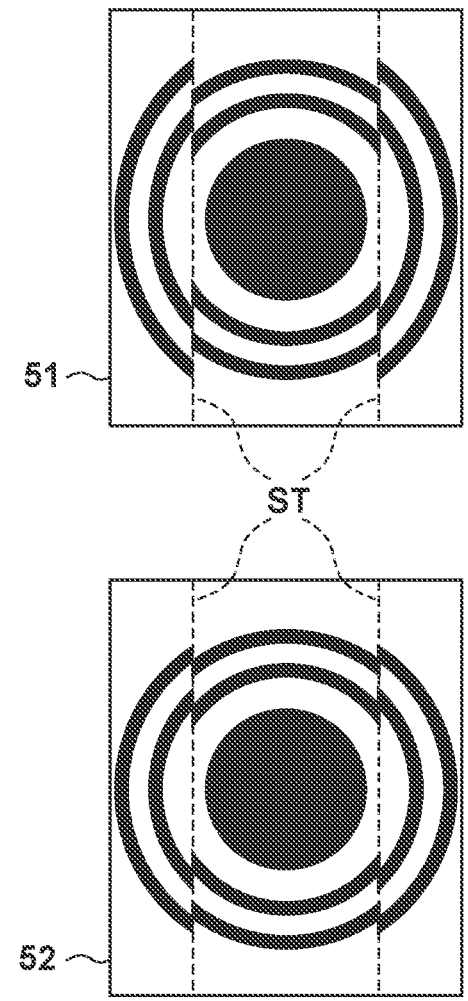

An example of generating a difference between the captured image 51 and the predicted image 52 will now be described. FIGS. 8A and 8B each show the captured image 51 and the predicted image 52 when steps are generated in the substrate S. Referring to FIGS. 8A and 8B, a broken line indicates a portion (to sometimes be referred to as a step portion ST hereinafter) where a step is generated on the substrate S. In the step portion ST, the interference fringes of the captured image 51 and the predicted image 52 can be distorted (deviated). If, as shown in FIG. 8A, the captured image 51 and the predicted image 52 almost match each other, it can be determined that the event which could not be considered in the simulation has not occurred in the actual film forming process. That is, it can be determined that the film forming process is performed under the same condition as the design condition (target condition) used in the simulation. On the other hand, if, as shown in FIG. 8B, the interference fringes of the captured image 51 are distorted more than those of the predicted image 52, it can be determined that a step larger than the design condition (step) used in the simulation is generated in the actual film forming process. Examples of the step portion ST are the unevenness of the curable composition IM supplied onto the substrate S, a foreign substance (particle) adhering onto the substrate S, and a step generated in the substrate S by exceeding the target value in a preceding process.

[Display Control Method of Images]

A display control method of the captured image 51 and the predicted image 52 by the display controller 13 will be described next. In this embodiment, the display controller 13 can display the captured image 51 and the predicted image 52 on the display screen DW of the display unit 30 so that they are synchronized with each other with respect to the distance in the Z direction between the mold M and the substrate S in the film forming process. That is, the display controller 13 can display the captured image 51 and the predicted image 52 on the display screen DW of the display unit 30 so that they correspond to each other with respect to the distance in the Z direction between the mold M and the substrate S in the film forming process.

FIG. 9 is a flowchart illustrating the display control method of the captured image 51 and the predicted image 52. The flowchart shown in FIG. 9 can be executed by the display controller 13. The flowchart shown in FIG. 9 can be applied to both a case in which the captured image 51 and the predicted image 52 are displayed as still images and a case in which the captured image 51 and the predicted image 52 are displayed as moving images. The following description assumes that before the start of the flowchart shown in FIG. 9, the obtainer 11 obtains, from the film forming apparatus IMP (image capturing device CM), the plurality of captured images 51 obtained by temporally capturing an image of the curable composition IM in the film forming process (for example, the contact process). Furthermore, the generator 12 generates the plurality of predicted images 52 by predicting the behavior of the curable composition IM for each of a plurality of conditions (states) in which the distance in the Z direction between the mold M and the substrate S in the film forming process is different. The plurality of captured images 51 and the plurality of predicted images 52 are stored in the memory 20 in association with the distance data in the Z direction between the mold M and the substrate S in the film forming process. The distance data in the Z direction between the mold M and the substrate S will sometimes simply be referred to as "distance data" hereinafter.

In step S21, the display controller 13 selects a target captured image to be displayed on the display screen DW of the display unit 30 from the plurality of captured images 51 obtained by the obtainer 11. For example, the display controller 13 may select, as the target captured image, the captured image 51 designated by the user via the input unit 40, or select, as the target captured image, the captured image 51 transmitted from the film forming apparatus IMP (image capturing device CM), as needed. When displaying the plurality of captured images 51 as a moving image on the display screen DW, the display controller 13 may select, as the target captured image, the captured image 51 to be displayed next to the captured image 51 currently displayed on the display screen DW.

In step S22, the display controller 13 specifies the distance in the Z direction between the mold M and the substrate S when the target captured image selected in step S21 is obtained (that is, when an image of the curable composition IM is captured by the image capturing device CM). For example, if each of the plurality of captured images 51 is stored in association with the distance data obtained when the captured image 51 is obtained, the display controller 13 can specify, based on the distance data, the distance when the corresponding captured image is obtained. On the other hand, if each of the plurality of captured images 51 is not stored in association with the distance data, the display controller 13 can obtain (specify), based on at least one of the dimension, pitch, and interval of the interference fringes in the target captured image, the distance when the corresponding captured image is obtained.

In step S23, the display controller 13 selects a target predicted image to be displayed on the display screen DW of the display unit 30 from the plurality of predicted images 52 generated by the generator 12. For example, as described above, each of the plurality of predicted images 52 is stored in association with the distance data. Therefore, the display controller 13 can select, from the plurality of predicted images 52, as the target predicted image, the predicted image 52 having the distance data corresponding to (for example, matching) the distance specified in step S22. There may be case in which the predicted image 52 having the distance data corresponding to the distance specified in step S22 does not exist in the plurality of predicted images 52. In this case, the display controller 13 may set a predetermined range to include the distance specified in step S22, and select, as the target predicted image, the predicted image 52 having the distance data falling within the range.

In step S24, the display controller 13 displays, on the display screen DW of the display unit 30, the target captured image selected in step S21 and the target predicted image selected in step S23 to be comparable to each other. For example, the display controller 13 can display the target captured image and the target predicted image on the display screen DW of the display unit 30, as shown in, for example, FIGS. 5 to 7.

This embodiment has explained the example of displaying the captured image 51 and the predicted image 52 on the display screen DW of the display unit 30 by synchronizing them with each other with respect to the distance in the Z direction between the mold M and the substrate S in the film forming process. The present invention, however, is not limited to this, and the display controller 13 may display the captured image 51 and the predicted image 52 on the display screen DW of the display unit 30 so that they are synchronized with each other with respect to the elapsed time from the start of the film forming process (for example, the contact process). Furthermore, the display controller 13 may display the captured image 51 and the predicted image 52 on the display screen DW of the display unit 30 so that they are synchronized with each other with respect to the various parameters (for example, the pressing force and the pressure of the space SP on the lower surface of the mold M) of the film forming apparatus IMP in the film forming process (for example, the contact process). That is, the captured image 51 and the predicted image 52 are displayed in synchronism with each other so that a change in the captured image and that in the predicted image can be comparable to each other. In this case, for example, the obtainer 11 obtains a plurality of captured images obtained by capturing an image of the curable composition IM by the image capturing device CM in accordance with a change in pressing force and/or the pressure of the space SP of the mold M in the film forming process (for example, the contact process). The generator 12 generates a plurality of predicted images by predicting the behavior of the curable composition 1M corresponding to the pressing force and/or the pressure of the space SP of the mold M. Then, the display controller 13 selects a target captured image to be displayed on the display unit 30 among the plurality of captured images and a target predicted image to be displayed on the display unit 30 among the plurality of captured images so that they are synchronized with each other with respect to the pressing force and/or the pressure of the space SP of the mold M. Note that the pressure of the space SP on the lower surface of the mold M can be said to be the pressure for controlling the shape of the mold M.

As described above, the display controller 13 of the information processing apparatus 1 according to this embodiment displays, on the display unit 30, the captured image 51 obtained by the obtainer 11 and the predicted image 52 generated by the generator to be comparable to each other. This allows the user to readily and quickly grasp the difference (the difference between the captured image 51 and the predicted image 52) from the simulation in the film forming process. Furthermore, the user can readily grasp the timing of a change between processes in the supply process (S11), contact process (S12), curing process (S13), and mold separation process (S14) of the film forming process, and an abnormality of each process.

Second Embodiment

The second embodiment according to the present invention will be described. This embodiment will describe another example of displaying, on a display screen DW of a display unit 30, a captured image 51 and a predicted image 52 to be comparable to each other. Note that this embodiment basically takes over the first embodiment. The arrangements/processes of a film forming apparatus IMP and an information processing apparatus 1 are the same as in the first embodiment, unless otherwise specified.

FIG. 10 shows an example of simultaneously displaying, on the same display screen DW, an image (difference image 53) representing the difference between the captured image 51 and the predicted image 52 together with the captured image 51 and the predicted image 52 each including interference fringes. For example, a processor (for example, a display controller 13) can calculate the difference between the captured image 51 and the predicted image 52 by a known image process to generate the difference image 53, and display the difference image 53 together with the captured image 51 and the predicted image 52 on the display screen DW of the display unit 30. This allows the user to readily and quickly grasp the difference from a simulation in a film forming process regardless of the ambiguity of the determination criterion for each user. By automatically generating the difference image 53, it is possible to optimize apparatus-specific parameters more efficiently.

Figure 11:
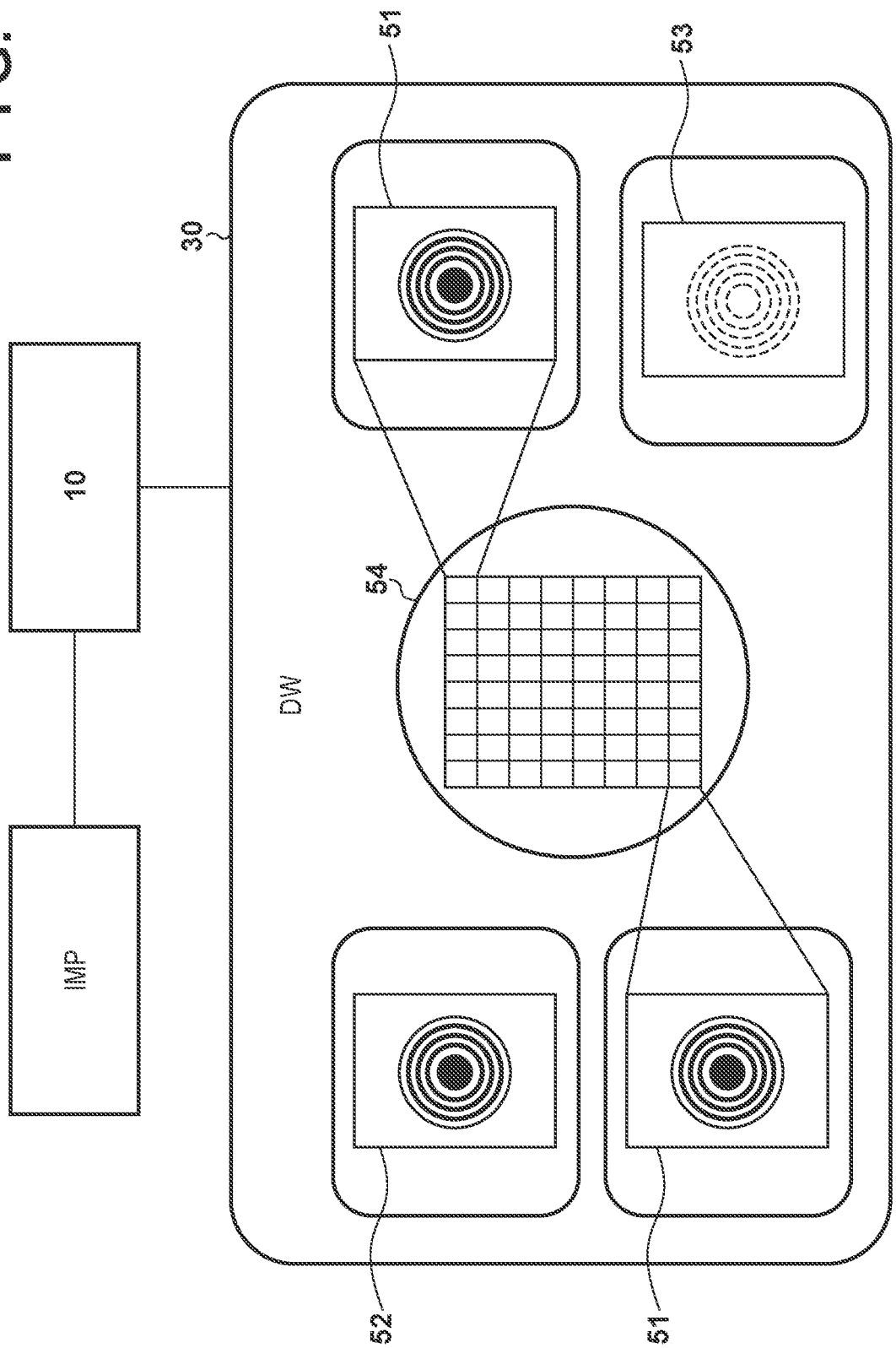
FIG. 11 is a view showing an example of display of the captured image and the predicted image.

FIG. 11 shows an example of displaying, on the display screen DW, an image (to sometimes be referred to as a layout image 54 hereinafter) representing layout information of a plurality of shot regions on the substrate S. For example, the captured image 51 and the predicted image 52 can be stored in a memory 20 in association with each of the plurality of shot regions on the substrate S. The display controller 13 displays the layout image 54 on the display screen DW of the display unit 30, and displays, on the display screen DW, the captured image 51 and the predicted image 52 of a shot region selected by the user via an input unit 40 among the plurality of shot regions indicated in the layout image 54. As shown in FIG. 11, the display controller 13 may display, on the display screen DW, the difference image 53 representing the difference between the captured image 51 and the predicted image 52. This allows the user to grasp the difference in the film forming process between shot regions and the tendency of the film forming process corresponding to the position of a shot region.

The display controller 13 may simultaneously display, on the same display screen DW, two or more captured images 51 stored in association with two or more shot regions. Alternatively, the display controller 13 may simultaneously display, on the same display screen DW, captured images 51 respectively obtained by two or more film forming apparatuses IMP, or load the predicted image 52 generated by another information processing apparatus and display it on the display screen DW.

Third Embodiment

The third embodiment according to the present invention will be described. This embodiment will describe an example of displaying, on a display screen DW of a display unit 30, a predicted image 55 representing, instead of a prediction result of interference fringes, a prediction result of the distribution of bubbles remaining in a curable composition during a film forming process to be comparable to a captured image 51. Note that this embodiment basically takes over the first embodiment. The arrangements/processes of a film forming apparatus IMP and an information processing apparatus 1 are the same as in the first embodiment, unless otherwise specified.

For example, a generator 12 predicts (simulates) the behavior of a curable composition IM in a contact process, and generates the predicted image 55 representing a prediction result of the distribution of bubbles remaining in the curable composition IM between a mold M and a substrate S during the film forming process (contact process). In addition, the generator 12 can calculate the position, pressure, and volume of each bubble that can remain in a film of the curable composition IM by a filling simulation, and also calculate the number of gas molecules as an amount proportional to the product of the pressure and volume of each bubble. That is, the predicted image 55 representing the prediction result of the distribution of the bubbles may include at least one piece of information of the position, the pressure, the volume, and the number of gas molecules of each bubble that can remain.

FIG. 12A shows the predicted image 55 representing the prediction result of the positions of bubbles 55a that can remain in the curable composition IM between the mold M and the substrate S during the contact process. FIG. 12B shows an example of displaying, on the display screen DW of the display unit 30, the predicted image 55 shown in FIG. 12A superimposed on the captured image 51 of interference fringes obtained by an image capturing device CM. In the contact process, it may be required to uniform the thickness of the film of the curable composition IM and to reduce the bubbles remaining in the film of the curable composition IM. Therefore, the user can confirm the display screen DW including the captured image 51 and the predicted image 55, as shown in FIG. 12B, thereby readily grasping a position/timing in the film forming process (contact process) at which each bubble is generated. Furthermore, if, for example, the substrate S includes a step (unevenness), the interference fringes of the captured image 51 are distorted from a concentric circular shape in a portion where the step is generated. Therefore, the user can grasp, from the captured image 51 and the predicted image 55, whether the bubble 55a (bubble defect) is generated in a portion where the interference fringes are distorted. If the bubble is generated in the portion where the interference fringes are distorted, the user can perform an operation such as adjustment of the amount and arrangement of droplets of the curable composition IM in the supply process so that the step of the substrate S is planarized (compensated).

FIG. 12C shows an example of displaying, on the display screen DW of the display unit 30, the predicted image 55 representing the prediction result of the position and the number of gas molecules of each bubble 55a superimposed on the captured image 51 of the interference fringes obtained by the image capturing device CM. In FIG. 12C, the size of a circle representing the position of the bubble 55a indicates the magnitude of the number of gas molecules of the bubble 55a. The magnitude of the number of gas molecules of the bubble 55a is not limited to the size of the circle, and may be represented by a color contour or another method. As the number of gas molecules is larger, each bubble 55a tends to remain in the film of the curable composition IM. The bubble 55a having a large number of gas molecules can be reduced by prolonging the time of filling the pattern of the mold M with the curable composition IM.

FIG. 12D shows an example of superimposing the predicted image 55 representing the prediction result of the position and volume of each bubble 55a on the captured image 51 of the interference fringes obtained by the image capturing device CM and displaying them on the display screen DW of the display unit 30. In FIG. 12D, the size of a circle presenting the position of each bubble 55a indicates the magnitude of the volume of the bubble 55a. The magnitude of the volume of the bubble 55a is not limited to the size of the circle, and may be represented by a color contour or another method. As the volume is larger, each bubble 55a tends to remain in the film of the curable composition IM. The bubble 55a having a large volume can be reduced by forming a gas vent between droplets in the contact process. Therefore, if the user confirms that the bubbles 55a remain after the contact process, he/she can perform an operation such as adjustment of the arrangement of droplets of the curable composition IM in the supply process so that a gas vent is formed between droplets in the contact process.

FIG. 12E shows an example of superimposing the predicted image 55 representing the prediction result of the position and the number of gas molecules of each bubble 55a on the captured image 51 of the interference fringes obtained by the image capturing device CM and displaying them on the display screen DW of the display unit 30. FIG. 12E shows an example of performing the film forming process for the substrate S having step portions ST, in which the size of a circle representing the position of each bubble 55a indicates the magnitude of the number of gas molecules of the bubble 55a. If the step portion ST exists in the substrate S, the distance in the Z direction between the mold M and the substrate S can discontinuously change near the step portion ST. In this location, the shape of the interference fringes can also discontinuously change. Furthermore, since filling with the curable composition IM is inhibited near the step portion ST, as compared with the flat portion, the bubble 55a (bubble defect) is readily generated near the step portion ST, as shown in FIG. 12E. In this case, the user can perform an operation such as adjustment of the arrangement of the droplets of the curable composition IM so as to cancel the step (to flatten the surface) in accordance with the shape of the step portion ST.

FIGS. 12A to 12E each show the example of superimposing, on the captured image 51, the predicted image 55 of the bubble distribution calculated using the filling simulation, as an example. However, a predicted image other than the predicted image of the bubble distribution calculated using the filling simulation may be superimposed on the captured image 51. Furthermore, description was given in FIGS. 12A to 12E using the example of superimposing the predicted image 55 including one kind of bubble information on the captured image 51, as an example. However, the predicted image 55 including a plurality of pieces of bubble information may be displayed simultaneously with the captured image 51. The predicted image 55 and the captured image 51 may be displayed as moving images.

As a defect other than the bubble defect, there is a chemical defect. A chemical defect can occur when the curable composition IM traps impurities in an atmosphere and the impurities are segregated in a droplet boundary portion of each droplet. Unlike the bubble defect, the chemical defect cannot be recognized as a defect at a glance since no gap is physically generated. However, this becomes a problem in, for example, an etching process performed after the film forming process when the etching resistance is different between the curable composition IM and the impurities. For example, if the etching resistance of the impurities is smaller than that of the curable composition IM, the impurity portion is etched more, and thus a desired pattern cannot be obtained. In the filling simulation, the droplet boundary portion of each droplet can be visualized. Therefore, by comparing an occurrence position when an abnormality occurs in the etching process with the droplet boundary position obtained from the simulation, it is possible to analyze the possibility of a chemical defect. If an abnormality occurs in the droplet boundary portion and a chemical defect is suspected, it is possible to replace a chemical filter of the film forming apparatus IMP or reconsider a flow control method while confirming the state of the atmosphere in the film forming apparatus IMP.

FIGS. 13A to 13C each show the captured image 51 when an abnormality occurs in the film forming process. FIG. 13A shows an abnormality occurring when the mold M is pressed from the left and right in the X-axis direction toward the inside of the shot region and is deformed in a U shape. In this case, a deviation of the relative position between the mold M and the substrate S occurs, thereby making it difficult to form the pattern of the mold M at a desired position. For example, if the mold M is held by contacting the periphery of the mold M, it is possible to improve the deformation of the mold M by weakening the pressing force of the mold M only in a specific direction (in this example, the X-axis direction) via the holding portion. As another method, it is possible to improve the deviation of the relative position between the mold M and the substrate S by applying heat to part or whole of the substrate S using a heat input unit (not shown) to deform the substrate S. Furthermore, it is also possible to improve the deviation of the relative position between the mold M and the substrate S by controlling a force of pressing the mold M against the curable composition IM in the contact process. For example, it is possible to suppress the deformation amount (warp amount) of the mold M in the convex shape by decreasing the force (pressing force) of pressing the mold M against the curable composition IM, thereby improving the deviation of the relative position. Furthermore, it is also possible to reduce the bubbles by decreasing the speed at which the mold M is pressed against the curable composition IM, that is, by slowly making the mold M closer to the substrate S. In contrast to FIG. 13A, if the deformation amount of the mold M is insufficient, for example, if a region wider than expected contacts the curable composition IM, it is possible to raise the pressure of the space SP on the lower surface of the mold M by the pressure controller PC to perform adjustment so that the mold M has a desired deformation amount.

FIG. 13B shows an abnormality occurring when, for example, the mold M tilts. When the mold M deformed in the convex shape tilts, the mold M first contacts the curable composition IM at a position deviated from the central portion of the shot region. In this case, there may be a case in which a region (for example, a right region in FIG. 13B) where the filling speed of the curable composition IM in the mold M is low may not be filled with the curable composition IM. In this case, it is possible to make the mold M and the curable composition IM first contact each other at the central portion of the shot region by adjusting a tilt correction mechanism (not shown) in the holder of the mold M or the substrate S. By adjusting the rotation (θZ direction) of the mold M or the substrate S with respect to the axis (in this example, the Y-axis) to be corrected, it is possible to make the mold M and the curable composition IM first contact each other at the central portion of the shot region.

FIG. 13C shows an abnormality occurring when, for example, a foreign substance PT (particle) is mixed between the mold M and the substrate S. If the foreign substance PT is sandwiched between the mold M and the substrate S, an abnormality may occur, for example, the pattern of the mold M is not transferred to the curable composition IM. To represent the abnormality to be recognized easily, FIG. 13C largely shows the foreign substance PT and the captured image 51 is largely deformed, which, however, is actually a very small change. For example, even if the foreign substance PT is as small as 1 μm or less, it becomes a problem. As the size of the foreign substance PT is smaller, it is more difficult to confirm the foreign substance PT in the captured image 51. Therefore, by displaying, on the display screen of the display unit 30, the captured image 51 and the predicted image 55 to be comparable to each other, as described above, it is possible to sensitively detect a change in the captured image 51 caused by the foreign substance PT. If the captured image 51 includes a small change that is difficult to be visually confirmed by the user, it is possible to readily recognize the small change by generating a difference image representing the difference between the captured image 51 and the predicted image 55 by the processor 10 and displaying the difference image on the display screen.

If, for example, the substrate S unintentionally has a local concave portion, it can be observed as a distortion of the interference fringes like the captured image 51 shown in FIG. 13C. In this case, it is possible to improve the distortion by increasing the film thickness of the curable composition IM only in the concave portion and flattening the surface of the curable composition IM as a whole as much as possible. For example, it is possible to change the thickness of a cured product of the curable composition IM by changing the amount or density of droplets of the curable composition IM. Since the positions of the droplets of the curable composition IM can be controlled at the same time, it is possible to control the film thickness distribution of the curable composition IM by combining the above operations. With this control technique, if, for example, the substrate S unintentionally has a local concave portion, it is possible to increase the film thickness of the curable composition IM only in the concave portion and flatten the surface of the curable composition IM as a whole as much as possible.

<Embodiment of Method of Manufacturing Article>

A method of manufacturing an article according to an embodiment of the present invention is suitable for manufacturing an article, for example, a microdevice such as a semiconductor device or an element having a microstructure. The method of manufacturing an article according to the embodiment includes a step of forming a cured film of a curable composition on a substrate by using the above-described film forming apparatus, and a step of processing the substrate on which the cured film of the curable composition has been formed in the preceding step. Furthermore, this manufacturing method includes other well-known steps (for example, oxidization, deposition, vapor deposition, doping, planarization, etching, resist removal, dicing, bonding, and packaging, and the like). The method of manufacturing an article according to the embodiment is superior to a conventional method in at least one of the performance, quality, productivity, and production cost of the article.

The cured film of the curable composition formed on the substrate by using the film forming apparatus is used permanently for at least some of various kinds of articles or temporarily when manufacturing various kinds of articles. The articles are an electric circuit element, an optical element, a MEMS, a recording element, a sensor, a mold, and the like. Examples of the electric circuit element are volatile or nonvolatile semiconductor memories such as a DRAM, a SRAM, a flash memory, and a MRAM and semiconductor elements such as an LSI, a CCD, an image sensor, and an FPGA. Examples of the mold are molds for imprint.

The cured film of the curable composition is directly used as the constituent member of at least some of the above-described articles or used temporarily as a resist mask. After etching or ion implantation is performed in the substrate processing step, the resist mask is removed.

Figure 14A:
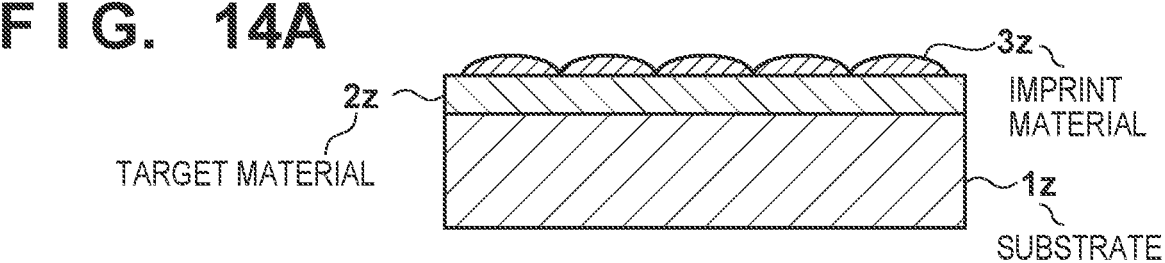
FIGS. 14A to 14F are views showing an example of a method of manufacturing an article.

A detailed method of manufacturing an article will be described next. Hereinafter, it will be described by using an imprint apparatus as an example of the film forming apparatus. As shown in FIG. 14A, a substrate 1z such as a silicon wafer with a target material 2z to be processed such as an insulator formed on the surface is prepared. Next, an imprint material 3z is applied to the surface of the target material 2z by an inkjet method or the like. A state in which the imprint material 3z is applied as a plurality of droplets onto the substrate is shown here.

Figure 14B:
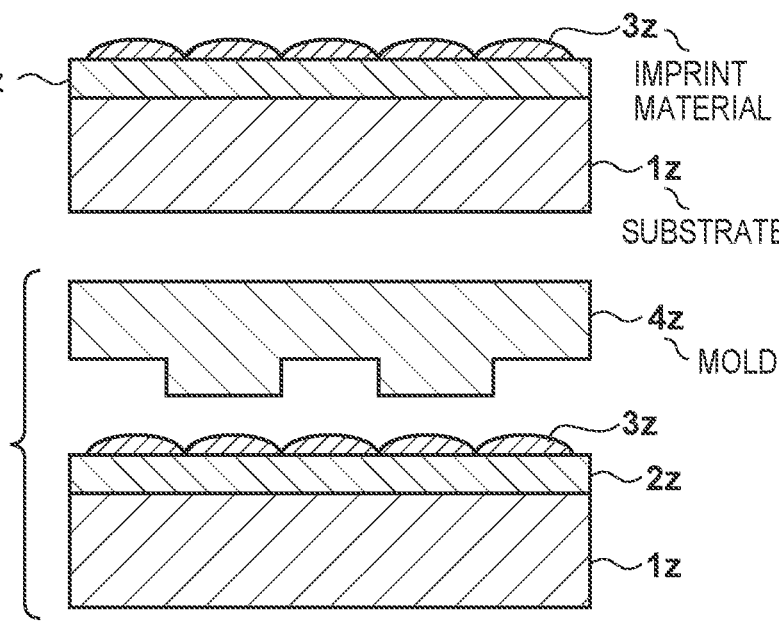
Figure 14C:
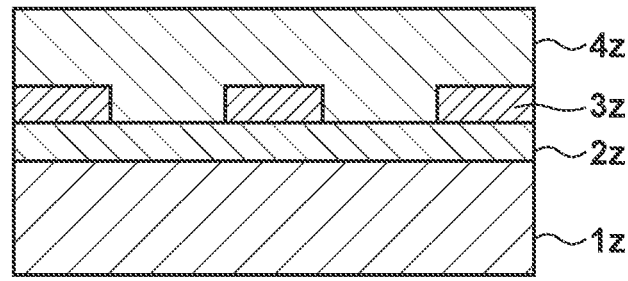

As shown in FIG. 14B, a mold 4z for imprint is caused to face to the substrate 1z such that a pattern with convex and concave portions formed in the mold 4z is directed to the imprint material 3z on the substrate 1z. As shown in FIG. 14C, the mold 4z and the imprint material 3z applied on the substrate 1z are brought into contact with each other, and subjected to a pressure. The gap between the mold 4z and the target material 2z is filled with the imprint material 3z. In this state, by irradiating the imprint material 3z with energy for curing through the mold 4z, the imprint material 3z is cured.

Figure 14D:
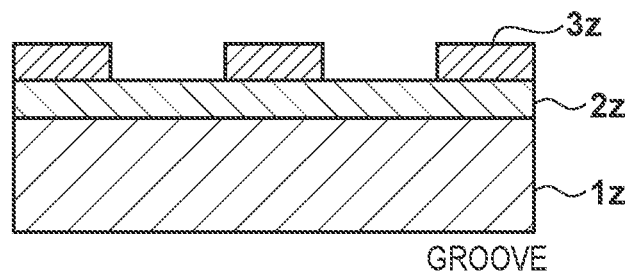

As shown in FIG. 14D, after the imprint material 3z is cured, the mold 4z is separated from the substrate 1z. Then, the pattern of the cured material of the imprint material 3z is formed on the substrate 1z. In the pattern of the cured material, the concave portion of the mold corresponds to the convex portion of the cured material, and the convex portion of the mold corresponds to the concave portion of the cured material. That is, the pattern with convex and concave portions in the mold 4z is transferred to the imprint material 3z.

Figure 14E:
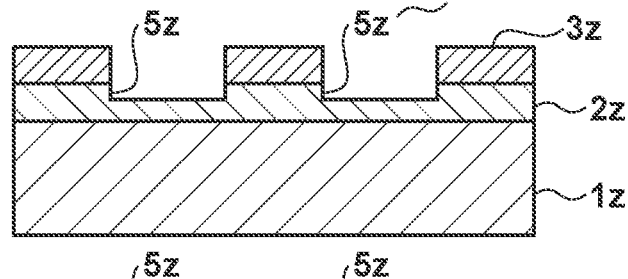
Figure 14F:
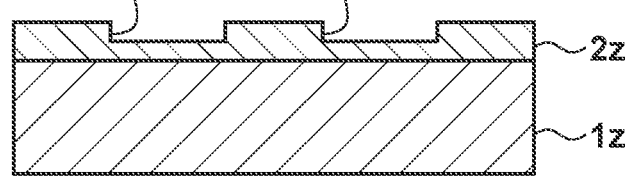

As shown in FIG. 14E, by performing etching process using the pattern of the cured material as an etching resistant mask, a portion of the surface of the target material 2z where the cured material does not exist or remains thin is removed to form a groove 5z. As shown in FIG. 14F, by removing the pattern of the cured material, an article with the grooves 5z formed in the surface of the target material 2z can be obtained. Here, the pattern of the cured material is removed. However, instead of processing or removing the pattern of the cured material, it may be used as, for example, an interlayer dielectric film included in a semiconductor element or the like, that is, a constituent member of an article.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-127639 filed on Jul. 28, 2020, which is hereby incorporated by reference herein in its entirety.

What is claimed is:

1. An information processing apparatus comprising:
   an obtainer configured to, in a process of supplying a curable composition onto a substrate or a mold and forming a film of the curable composition in a space between the substrate and the mold, obtain a plurality of captured images by temporally capturing an image of the curable composition;
   a generator configured to generate a plurality of predicted images by predicting a temporal behavior of the curable composition in the process, each of the plurality of predicted images representing a prediction result of a behavior of the curable composition on the substrate in the process; and
   a display controller configured to
   select a target captured image to be displayed on a display unit among the plurality of captured images and a target predicted image to be displayed on the display unit among the plurality of predicted images so that the target captured image and the target predicted image are synchronized with each other with respect to an elapsed time of the process, and
   display, on the display unit, the target captured image and the target predicted image to be comparable to each other.

2. The apparatus according to claim 1, wherein the display controller displays the target captured image and the target predicted image on the display unit so that a change in the plurality of captured images and a change in the plurality of predicted images are synchronized with each other.

3. An information processing apparatus comprising:
   an obtainer configured to, in a process of supplying a curable composition onto a substrate or a mold and forming a film of the curable composition in a space between the substrate and the mold, obtain a plurality of captured images by temporally capturing an image of the curable composition while changing a distance between the mold and the substrate;
   a generator configured to generate a plurality of predicted images by predicting a behavior of the curable composition for each of a plurality of conditions in which the distances are different, each of the plurality of predicted images representing a prediction result of the behavior of the curable composition on the substrate in the process; and
   a display controller configured to
   select a target captured image to be displayed on a display unit among the plurality of captured images and a target predicted image to be displayed on the display unit among the plurality of predicted images so that the target captured image and the target predicted image are synchronized with each other with respect to the distance, and
   display, on the display unit, the target captured image and the target predicted image to be comparable to each other.

4. The apparatus according to claim 3, wherein the display controller selects, as the target predicted image, a predicted image whose distance corresponds to the target captured image from the plurality of predicted images.

5. The apparatus according to claim 3, wherein the display controller obtains the distance based on an interference fringe in the target captured image, and selects, as the target predicted image, a predicted image corresponding to the obtained distance from the plurality of predicted images.

6. An information processing apparatus comprising:
an obtainer configured to, in a process of supplying a curable composition onto a substrate or a mold and forming a film of the curable composition in a space between the substrate and the mold, obtain a plurality of captured images by capturing an image of the curable composition in accordance with a change of a pressing force of the mold against the curable composition and a change of a pressure for controlling a shape of the mold;
a generator configured to generate a plurality of predicted images by predicting a behavior of the curable composition in accordance with the changes of the pressing force and the pressure in the process; and
a display controller configured to
select a target captured image to be displayed on a display unit among the plurality of captured images and a target predicted image to be displayed on the display unit among the plurality of predicted images so that the target captured image and the target predicted image are synchronized with each other with respect to the pressing force and the pressure in the process, and
display, on the display unit, the target captured image and the target predicted image to be comparable to each other.

7. The apparatus according to claim 1, wherein the display controller displays the target captured image and the target predicted image on the display unit by aligning the target captured image and the target predicted image with each other with respect to at least one of a dimension and a rotation.

8. The apparatus according to claim 1, wherein the display controller displays, on the display unit, layout information of a plurality of shot regions on the substrate, and displays, on the display unit, the target captured image and the target predicted image of a shot region selected from the plurality of shot regions in the layout information.

9. The apparatus according to claim 1, wherein the display controller displays the target captured image and the target predicted image on the same screen of the display unit.

10. The apparatus according to claim 1, wherein the display controller displays, on the display unit, the target captured image and the target predicted image superimposed on each other.

11. The apparatus according to claim 1, wherein the display controller displays the target captured image and the target predicted image as moving images on the display unit.

12. The apparatus according to claim 1, wherein each of the plurality of captured images is an image obtained by capturing an image of an interference fringe generated in accordance with a distance between the mold and the substrate during the process.

13. The apparatus according to claim 1,
wherein each of the plurality of predicted images is an image representing a prediction result of an interference fringe generated in accordance with a distance between the mold and the substrate during the process.

14. The apparatus according to claim 1,
wherein each of the plurality of predicted images is an image representing a prediction result of a distribution of bubbles remaining in the curable composition during the process.

15. The apparatus according to claim 14, wherein each of the plurality of predicted images includes at least one piece of information of a position, a pressure, a volume, and the number of gas molecules of the bubble.

16. A film forming apparatus for performing a process of supplying a curable composition onto a substrate or mold and forming a film of the curable composition in a space between the substrate and the mold, comprising:
a driver configured to relatively drive the mold and the substrate;
an image capturing device configured to capture an image of the curable composition between the substrate and the mold; and
a controller configured to control the process,
wherein the controller includes an information processing apparatus defined in claim 1.

17. A method of manufacturing an article, the method comprising:
forming a film of a curable composition on a substrate by using a film forming apparatus according to claim 16;
processing the substrate, on which the film of the curable composition has been formed, to manufacture the article.

18. A non-transitory computer-readable storage medium storing a program for functioning a computer as an information processing apparatus according to claim 1.

19. An information processing apparatus comprising:
an obtainer configured to, in a process of supplying a curable composition onto a substrate or a mold and forming a film of the curable composition in a space between the substrate and the mold, obtain the captured image of the curable composition;
a generator configured to generate a predicted image representing a prediction result of a behavior of the curable composition on the substrate in the process; and
a display controller configured to display, on a display unit, the captured image and the predicted image to be comparable to each other,
wherein the display controller displays the captured image and the predicted image on the display unit by aligning the captured image and the predicted image with each other with respect to at least one of a dimension and a rotation.

20. An information processing apparatus comprising:
an obtainer configured to, in a process of supplying a curable composition onto a substrate or a mold and forming a film of the curable composition in a space between the substrate and the mold, obtain the captured image of the curable composition;
a generator configured to generate a predicted image representing a prediction result of a behavior of the curable composition on the substrate in the process; and
a display controller configured to display, on a display unit, the captured image and the predicted image to be comparable to each other,
wherein the display controller displays, on the display unit, layout information of a plurality of shot regions on the substrate, and displays, on the display unit, the captured image and the predicted image of a shot region selected from the plurality of shot regions in the layout information.

21. An information processing apparatus comprising:
an obtainer configured to, in a process of supplying a curable composition onto a substrate or a mold and forming a film of the curable composition in a space between the substrate and the mold, obtain the captured image of the curable composition;

a generator configured to generate a predicted image representing a prediction result of a behavior of the curable composition on the substrate in the process; and a display controller configured to display, on a display unit, the captured image and the predicted image to be comparable to each other, wherein the predicted image is an image representing a prediction result of an interference fringe generated in accordance with a distance between the mold and the substrate during the process.

22. An information processing apparatus comprising:

an obtainer configured to, in a process of supplying a curable composition onto a substrate or a mold and forming a film of the curable composition in a space between the substrate and the mold, obtain the captured image of the curable composition;

a generator configured to generate a predicted image representing a prediction result of a behavior of the curable composition on the substrate in the process; and a display controller configured to display, on a display unit, the captured image and the predicted image to be comparable to each other, wherein the predicted image is an image representing a prediction result of a distribution of bubbles remaining in the curable composition during the process.

* * * * *